US009053601B2

(12) United States Patent
Seelig et al.

(10) Patent No.: US 9,053,601 B2
(45) Date of Patent: Jun. 9, 2015

(54) PROGRESSIVE GAMING DEVICE AND METHOD OF USE

(75) Inventors: Jerald C. Seelig, Absecon, NJ (US); Lawrence M. Henshaw, Hammonton, NJ (US)

(73) Assignee: IGT, Reno, NV (US)

( * ) Notice: Subject to any disclaimer, the term of this patent is extended or adjusted under 35 U.S.C. 154(b) by 1767 days.

(21) Appl. No.: 12/026,196

(22) Filed: Feb. 5, 2008

(65) Prior Publication Data

US 2008/0188296 A1 Aug. 7, 2008

Related U.S. Application Data

(60) Provisional application No. 60/888,303, filed on Feb. 5, 2007.

(51) Int. Cl.
*A63F 13/00* (2014.01)
*G06F 17/00* (2006.01)
*G07F 17/32* (2006.01)

(52) U.S. Cl.
CPC ............ *G07F 17/32* (2013.01); *G07F 17/3258* (2013.01)

(58) Field of Classification Search
None
See application file for complete search history.

(56) References Cited

U.S. PATENT DOCUMENTS 4,448,419 A 5/1984 Telnaes
5,042,810 A 8/1991 Williams
5,280,909 A * 1/1994 Tracy .............................. 463/27
5,344,144 A * 9/1994 Canon .............................. 463/27
5,456,465 A 10/1995 Durham
5,848,932 A 12/1998 Adams
6,089,980 A 7/2000 Gauselmann
6,110,043 A * 8/2000 Olsen .............................. 463/27
6,336,863 B1 1/2002 Baerlocher et al.
6,358,149 B1 * 3/2002 Schneider et al. .............. 463/27
6,416,409 B1 * 7/2002 Jordan ............................ 463/27
6,656,052 B2 12/2003 Abramopoulos et al.
7,419,430 B1 * 9/2008 Joshi et al. ...................... 463/27
2001/0004607 A1 * 6/2001 Olsen .............................. 463/26
2001/0034260 A1 * 10/2001 Luciano et al. ................. 463/16
2002/0132660 A1 * 9/2002 Taylor ............................. 463/16
2003/0220138 A1 * 11/2003 Walker et al. ................... 463/25
2004/0102243 A1 * 5/2004 Olsen .............................. 463/25
2004/0152511 A1 8/2004 Nicely et al.
2004/0192428 A1 * 9/2004 Byrne ............................. 463/16
2004/0229683 A1 * 11/2004 Mothwurf et al. .............. 463/26
2004/0229700 A1 * 11/2004 Cannon et al. .................. 463/42
2004/0242320 A1 * 12/2004 Jackson .......................... 463/26
2005/0037837 A1 2/2005 Rowe
2005/0070356 A1 * 3/2005 Mothwurf et al. .............. 463/26
2005/0148380 A1 * 7/2005 Cannon et al. .................. 463/16
2005/0176499 A1 * 8/2005 Stronach ......................... 463/27
2005/0181856 A1 * 8/2005 Cannon et al. .................. 463/16
2005/0215314 A1 * 9/2005 Schneider et al. .............. 463/26

(Continued)

FOREIGN PATENT DOCUMENTS

WO WO2007106659 A2 9/2007

*Primary Examiner* — Paul A D'Agostino
(74) *Attorney, Agent, or Firm* — Griffiths & Seaton PLLC

(57) ABSTRACT

A gaming apparatus includes a gaming device that is adapted to accept a wager and allow a player to play a game. A controller is in communication with the gaming device. The controller maintains a progressive jackpot and randomly determines a contribution amount from the wager placed on each game cycle by each participating player. The contribution amount is collected from the wager and added to the progressive jackpot. A gaming method using the gaming apparatus is also disclosed.

18 Claims, 15 Drawing Sheets

(56) References Cited

U.S. PATENT DOCUMENTS

| | | | | |
|---|---|---|---|---|
| 2006/0019743 | A1 * | 1/2006 | Roemer | 463/26 |
| 2006/0030397 | A1 * | 2/2006 | Chan | 463/20 |
| 2006/0035706 | A1 | 2/2006 | Thomas et al. | |
| 2006/0040736 | A1 * | 2/2006 | Baerlocher et al. | 463/27 |
| 2006/0052162 | A1 * | 3/2006 | Soukup et al. | 463/27 |
| 2006/0073888 | A1 | 4/2006 | Nguyen et al. | |
| 2006/0211465 | A1 * | 9/2006 | Moshal | 463/16 |
| 2006/0287077 | A1 * | 12/2006 | Grav et al. | 463/27 |
| 2007/0054733 | A1 * | 3/2007 | Baerlocher | 463/27 |
| 2007/0218975 | A1 * | 9/2007 | Iddings et al. | 463/25 |
| 2007/0259711 | A1 * | 11/2007 | Thomas | 463/22 |
| 2008/0108423 | A1 * | 5/2008 | Benbrahim et al. | 463/25 |
| 2009/0305777 | A1 * | 12/2009 | Anderson | 463/27 |
| 2010/0113131 | A1 * | 5/2010 | Aoki et al. | 463/20 |

* cited by examiner

PROGRESSIVE GAMING DEVICE AND METHOD OF USE

CROSS REFERENCE TO RELATED AND CO-PENDING APPLICATIONS

This patent application claims priority to U.S. Provisional Patent Application Ser. No. 60/888,303, filed on Feb. 5, 2007. The entire contents of which are herein incorporated by reference.

FIELD OF THE INVENTION

The present invention relates to gaming devices and, more particularly, to a gaming device that provides several progressive jackpots that can change and be funded in several ways.

BACKGROUND

Gaming devices are well known in the art and a large variety of gaming devices have been developed. In general gaming devices allow users or players to play a game. In many casino-type gaming devices, the outcome of the game depends, at least, in part, on a randomly generated event. For example, a gaming device may use a random number generator to generate a random or pseudo-random number (hereinafter, both types are referred to as a "random number").

The random number can be used to determine a game outcome. For example, the random number may then be compared to a predefined table to determine a corresponding outcome of the event. If the random number falls within a certain range of numbers on the table, the player may win the corresponding predefined prize. The table may also contain display information that allows the gaming device to generate a display that corresponds to the outcome of the game. The gaming device may present the outcome of the game on a large variety of display devices, such as mechanical spinning reels or video screens.

Some gaming devices award bonus prizes in addition to prizes that are awarded in a primary game. Of course, the prize in the primary game may simply be the opportunity to play the bonus game. A bonus prize is generally defined as a prize in addition to the prize obtained from the primary game and that is awarded to the player when a predefined event occurs. An example of a bonus game can be found in U.S. Pat. No. 5,848,932 to Adams. Adams discloses a primary game having three spinning game reels and a bonus game having a bonus display with one spinning wheel. The spinning wheel is divided into multiple sections, and each section has a symbol representing a prize. When predetermined indicia are displayed on the spinning game reels of the primary game, the wheel of the bonus display spins and stops. The bonus prize is displayed as the symbol on the wheel being pointed to by a pointer. The bonus prize is awarded in addition to any prizes awarded in the primary game. Another bonus game is disclosed in Baerlocher et al. (U.S. Pat. No. 6,336,863). Baerlocher et al, discloses a slot machine with a bonus award display. The bonus award display has a bonus wheel and a mechanical, movable pointer.

Gaming devices in casinos are more successful when they are able to captivate and hold a game player's interest for a long period of time. When a game player plays a gaming device for a longer period of time, more revenue is generated for the casino. A game player may lose interest with a game that has a static display that changes very little over time or that they player deems to be unattractive.

One way gaming device manufactures have added additional enjoyment and excitement to gaming devices is through the advent of progressive gaming. Progressive games have become very popular in casinos. Progressive slot machines contain jackpots that increase every time a player places a wager in a primary game of the slot machine. Progressive jackpots involve one or more gaming machines. For example, an individual progressive slot machine has a self-contained jackpot, wherein the jackpot grows with every play of that machine. A linked progressive includes two or more slot machines at the same or different locations connected to a common jackpot, each of which individually contribute to the jackpot. The gaming machines usually take a percentage of the players wager, such as 2%, and add it to the progressive jackpot. This allows the progressive jackpot to grow over time. The progressive jackpots can reach sizable amounts, such as multi-million dollar jackpots, before a player "hits" or wins the progressive jackpot.

Large progressive jackpots can be very attractive to casino game players. Furthermore, as the progressive jackpot grows, so does the game's payout percentage because the game pays out more while the likelihood of receiving the progressive award or jackpot remains constant. Players looking to inject skill or strategy into a gaming event therefore look to find progressive games having relatively high progressive jackpots, i.e., games that have not recently paid out. In an effort to further increase the excitement and enjoyment of progressive games and gaming devices in general, it is therefore desirable to inject player interaction, skill, strategy or risk into a progressive gaming device.

Progressive jackpots pay awards very infrequently. The long periods of time between progressive awards causes progressive gaming displays to appear to be very static or slowly changing. Gaming machine players may eventually lose interest in the game and stop playing. This is especially true in casino locations where a large number of linked progressives are located. It can appear to a game player in these locations that there are no winning game players and that the progressive prize will almost never be awarded. A progressive gaming device that has a display that changes parameters and funding of the progressive jackpot game more frequently can increase and prolong player interest.

SUMMARY OF ONE EMBODIMENT OF THE INVENTION

Advantages of one or More Embodiments of the Present Invention

The various embodiments of the present invention may, but do not necessarily, achieve one or more of the following advantages:

the ability to provide game players with a more exciting and desirable gaming experience;

the ability to attract more patrons to play a game;

provide longer play times and a greater payout possibility for a player;

provide greater revenues for gaming operators;

provide a gaming device that can fund one or more progressive jackpots by randomly determining an amount of a wager to be apportioned and added to the progressive jackpots.

provide a gaming device that utilizes a visually appealing and highly visible display;

provide a gaming device that may allow a player to see the values of two or more progressive jackpots;

provide a gaming device that increases one or more progressive jackpots in a random or variable manner;

provide a gaming device that can randomly select a contribution amount to be added to several jackpots and that can also randomly select the amount to be added to each of the progressive jackpots in a random or variable manner;

provide a gaming device that may allow a player to see when a progressive jackpot award value may be increased; and provide a gaming device that uses a timer to display when a progressive jackpot will change value.

These and other advantages may be realized by reference to the remaining portions of the specification, claims, and abstract.

BRIEF DESCRIPTION OF ONE EMBODIMENT OF THE PRESENT INVENTION

In certain embodiments, the present invention relates to a gaming apparatus that includes a gaming device that is adapted to accept a wager and allow a player to play a game. A controller is in communication with the gaming device. The controller maintains a progressive jackpot and randomly determines a contribution amount. The contribution amount is collected from the wager and added to the progressive jackpot.

In other embodiments, the present invention relates to a gaming method. According to the method, a player is allowed to place a wager and play a game. The game includes at least one progressive jackpot. A first amount of the wager to be apportioned to fund the progressive jackpot is randomly determined. The first amount is collected and added to the progressive jackpot. The random percentage may be collected from the entire wager amount from all participating players or a different random percentage may be calculated for each wager from each participant the random percentage to be contributed to the progressive jackpot may be calculated and deducted from the wagers in such a way that a portion of the wager of all participating players is added to the progressive jackpot.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Game Apparatus

Figure 1A:
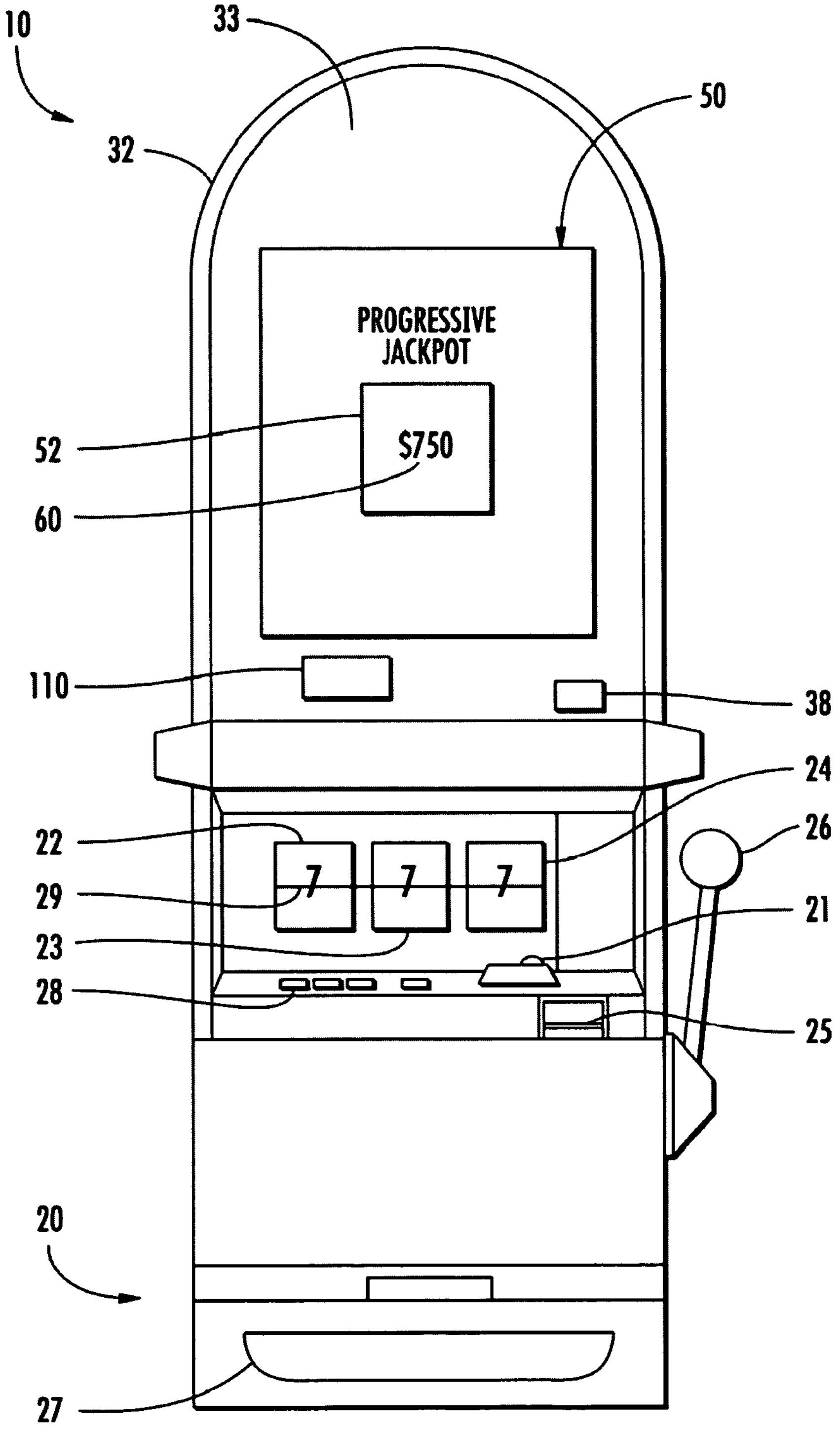
FIG. 1A is substantially a front view of a gaming apparatus of the present invention.

Referring to FIG. 1A, one embodiment disclosed herein comprises a gaming apparatus or device, generally indicated by reference number 10. Gaming apparatus 10 comprises a primary gaming device 20 and a bonus or progressive jackpot gaming apparatus or device 30. Progressive jackpot gaming device 30 may comprise a display device 50. Gaming device 20 may be any of a large number of devices that are adapted to allow players to play a game. For example, gaming device 20 may utilize reel displays, such as spinning reels 22-24 with a payline 29 or a video display (not shown), to display outcomes of the game. Means may also be provided for accepting wagers, such as a coin slot 21 or card reader 25, and for awarding prizes, such as a coin dispenser 27. A handle 26 and button 28 are provided for activating gaming device 20 to begin a game. In at least one embodiment, gaming device 20 may be an S Plus model gaming device manufactured by International Game Technology in Reno, Nev.

Figure 2:
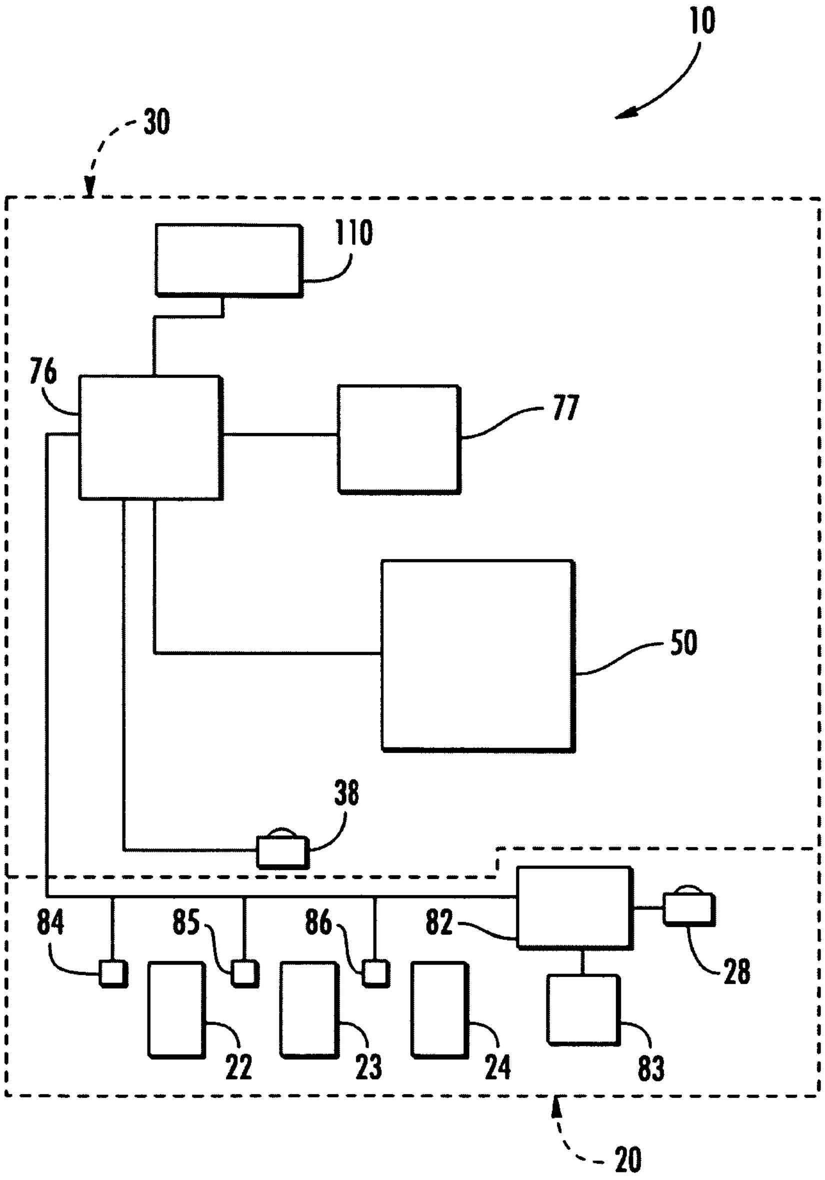
FIG. 2 is substantially a schematic diagram of a portion of the gaming apparatus of FIG. 1.

Gaming device 20 may be controlled by an electronic controller 82 (see FIG. 2) that utilizes a random number generator 83 (FIG. 2). The random number generator 83 produces a random or pseudo random number for each game. The outcome of the game may be determined by comparing the random number to a table of outcomes stored in a memory and accessed by controller 82. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. Controller 82 causes spinning reels 22-24 of the video display to show the outcome of the game that corresponds to the outcome of the random number generator 83. It is recognized that gaming device 20 may operate in many other ways and still achieve the objects of the present invention.

Gaming device 20 may also be capable of producing a jackpot qualifying or awarding event. This event may be many different types of events. For example, a jackpot qualifying or awarding event may comprise displaying a particular symbol, such as a "bonus" symbol, or combination of symbols, such as three "7" symbols, on reels 22-24 as shown in FIG. 1A. If the game being played is poker based, the jackpot qualifying event may be the occurrence of a certain hand, such as a royal flush. Furthermore, a jackpot qualifying event may occur when a player accumulates a number of symbols or game outcomes over a number of separate game plays. For example, a jackpot qualifying event may occur when the player receives three "jackpot" symbols during a period of time. The jackpot qualifying event may be based on an external event.

Progressive Jackpot Game

Referring to FIGS. 1A and 2, progressive jackpot game apparatus, progressive jackpot display device or progressive jackpot gaming device 30 may have a housing 32 with a front panel 33. Housing 32 can be made from many different materials such as metal or plastic and can include decorative coverings or attachments and lights. A player input device 38 can be mounted in housing 32. Player input device 38 can be buttons or handles or rotary knobs. Player input device 38 can allow a game player to provide input to progressive jackpot gaming device 30. A display 110 such as a credit meter can be used to display prizes won on progressive jackpot gaming device 30.

A display 50 such as a video display can be mounted in front panel 33. Display 50 can be any suitable display including video displays, plasma displays, LCD displays, LED meters and the like. Display 50 may be a single display or can be more than one display. Various video presentations can be shown on display 50 including games, movies and information.

As seen in FIG. 1A, display 50 is shown displaying a progressive jackpot 52. Alternatively, progressive jackpot 52 could be shown on a LED meter.

Progressive jackpots 52 has an associated indicia or progressive jackpot award value 60 that can be awarded to a player as a prize. Progressive jackpot award value 60 can be a wide variety of awards, such as trips, vouchers, gaming credits, comps for meals or hotels or monetary awards. A game player playing gaming apparatus 10 may be awarded progressive jackpot 52.

In an embodiment, award value 60 may be a hidden or mystery progressive jackpots wherein the award value of the progressive jackpot is not revealed to the game player until after the progressive jackpot has been won.

In one embodiment, progressive jackpot 52 can be funded in a conventional manner wherein a percentage or portion of the wagers placed on each gaming device 10 is reserved to increase the amount of the progressive jackpot. A portion of each wager is deducted from the wager and added to the progressive jackpot thereby increasing the amount of the progressive jackpot over time until the progressive jackpot is awarded.

While a single gaming apparatus 10 with a progressive jackpot 52 is shown in FIG. 1A, it is understood that the progressive jackpot 52 will also be present in additional linked gaming apparatuses 10 as will be described later. When a large number of gaming apparatuses are linked together, very large progressive jackpots may result.

In an embodiment, progressive jackpot 52 can be funded in a variable manner that changes over time or when a predetermined or triggering event occurs. For example, the percentage deducted from the wagers and added to the progressive jackpot may be randomly selected within a range of percentages. The range of percentages may be from 1 to 20 percent in one embodiment. During one game cycle 2% (two percent) of the wagers could be deducted and added to progressive jackpot 52. During another game cycle 15 percent of the wagers could be deducted and added to progressive jackpot 52. The random percentage of the wager may be determined by random number generator 77 and controller 76.

In another embodiment, a randomly selected amount within a range of amounts can be deducted from the wagers and added to the progressive jackpot. For example, the range of amounts may be $1.00 to $20.00. During, one game cycle $1.00 of the total amount wagered could be deducted and added to progressive jackpot 52. During another game cycle $12.00 could be deducted from the total amount wagered and added to progressive jackpot 52. The random amount of the wager deducted may be determined by random number generator 77 and controller 76.

The randomly selected percentage or amount deducted from the wagers to be added to the progressive jackpot may change with every wager placed or may only change when a triggering event occurs. The triggering event may be many different kinds of events. For example, the triggering event may be the expiration of a pre-determined time period, the expiration of a random time period, when progressive jackpot 52 reaches a pre-determined award value 60 or when a randomly generated event occurs.

For example, a triggering event may be set to occur when the progressive jackpot award value 60 reaches $1000. When the award value reaches $1000, a new percentage or amount to be added to progressive jackpot 52 is determined. Alternatively, the triggering event may be set to occur when a time period expires. For example, a new percentage or amount to be added to progressive jackpot 52 may be changed or determined every 30 minutes.

Gaming apparatus 10 can provide a progressive gaming system that changes or varies the contribution or funding to the progressive jackpot over time. In this manner the funding of progressive jackpot 52 is not static but is variable. The variable funding of progressive jackpot 52 can attract and retain the interest of game players playing gaming apparatus 10.

Figure 3:
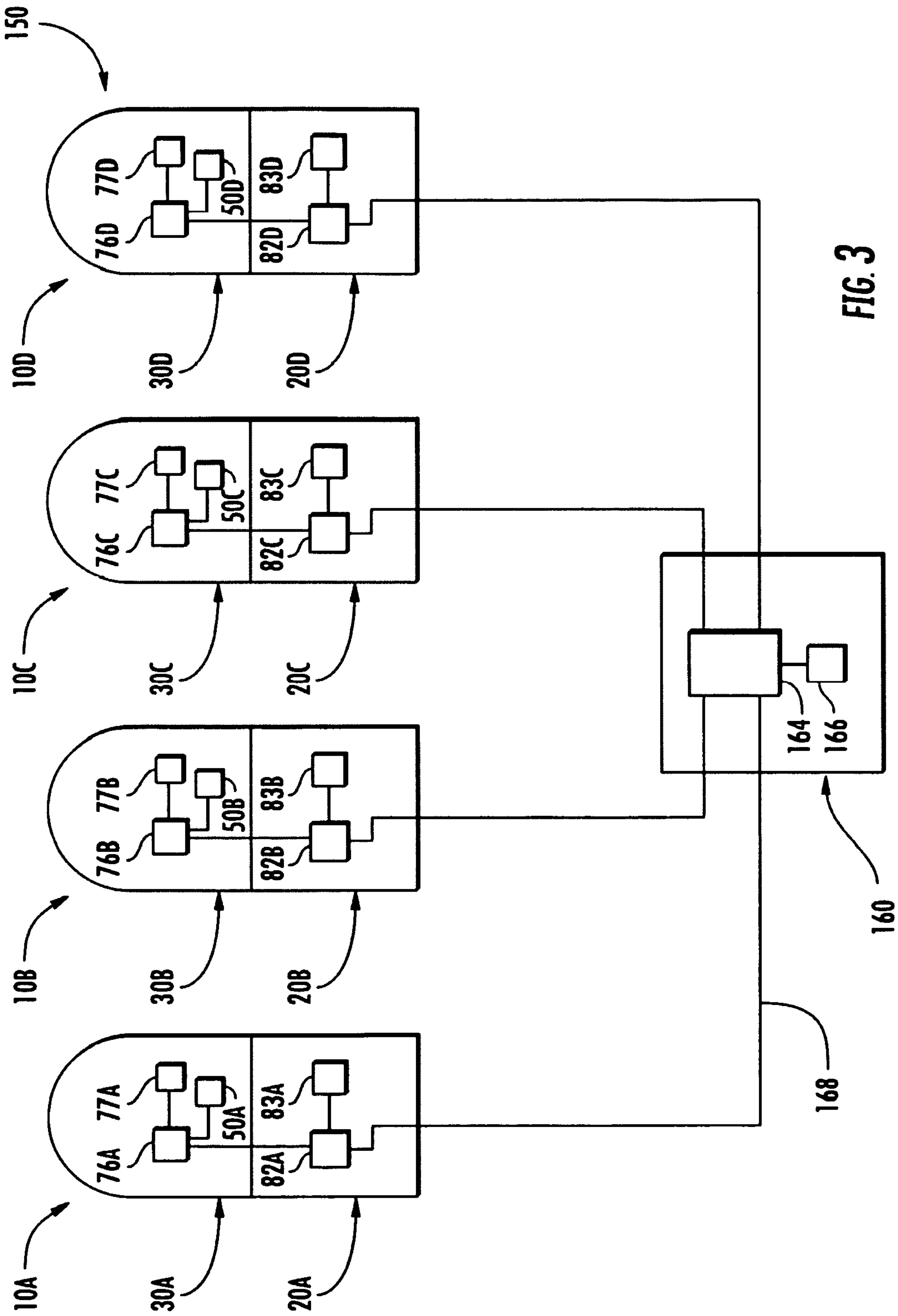
FIG. 3 is substantially a schematic diagram of several of the gaming apparatuses of FIG. 1 connected in a network.

With reference to FIG. 3, a network 150 of gaining apparatuses 10 is shown. Network 150 can include several interconnected gaming apparatuses 10A, 10B, 10C and 10D. While four gaming apparatuses are shown, more or less can be used. Gaming apparatuses 10A-D can each have a primary gaming device 20A-D and a progressive jackpot gaming device 30A-D, respectively. Each of primary gaming devices 20A-D can have a controller 82A-D and random number generator 83A-D, respectively.

Gaming apparatuses 10A-D may be in communication with a computer network server 160 through cables 168 such as an Ethernet cable. Server 160 can be a conventional network server that contains a memory 166, a controller or processor 164 and software that can operate on the processor in order to operate network 150 and gaming apparatuses 10A-D.

Server 160 can collect and transmit game information and instructions between server 160 and gaming devices 10A-D. For example, server 160 can deduct or apportion a variable percentage of each wager placed on gaming devices 10A-D to fund progressive jackpot 52. In an embodiment, between 1 and 20 percent of any wagers placed on gaming devices 10A-D may be deducted from the wager and contributed or added to fund progressive jackpot 52.

Turning now to FIGS. 1A, 2 and 3, progressive jackpot gaming device 30 comprises a controller 76 that is adapted to control the operation of the progressive jackpot gaming device. Controller 76 may be one or more micro-computers or processor boards. Random number generator 77 may be in communication with controller 76. Random number generator 77 is capable of randomly generating a random number and providing the random number to controller 76. As shown in FIG. 3, each of progressive jackpot gaming devices 30A-D contains controllers 76A-D and random number generators 77A-D, respectively. Controllers 76A-D are further in communication with and can control displays 50A-D. Controllers 76A-D can show or present various video presentations on displays 50A-D.

It is recognized that controller 76 and random number generator 77 may be a single processor or processor board. Furthermore, it is also recognized that controllers 76 and 82, and random number generators 77 and 83 may be combined in a single processor or processor board. Each of controllers 76A-D may be in communication with server 160 (FIG. 3).

Server 160 and controllers 76A-D can maintain and determine the size of progressive jackpot 52, maintain and determine the amount and method of funding of progressive jackpot 52 and determine when progressive jackpot 52 may be won or awarded. Server 160 and controllers 76A-D can further cause each of displays 50A-D in gaming devices 10A-D to display progressive jackpot 52 and the current award value 60.

In an alternative embodiment, server 160 can control the entire operation of progressive gaming devices 30A-D and controllers 76A-D can be omitted.

Controller 76 or server 160 can change and control the funding of progressive jackpot 52. Progressive jackpot 52 can be funded in a variable manner. During one game cycle or period, the wagers placed on all of the gaming apparatuses 10 in network 150 may be added to form a total wagered amount. Controller 76 or server 160 can randomly select a percentage of the total amount wagered to be apportioned as a contribution amount and added to the progressive jackpot 52.

The random percentage can be with a range of percentages so that the amount taken from the total amount wagered is a reasonable amount and is not too large or small a fraction of the total amount wagered. In an embodiment, the range of percentages can be from 1to 20 percent.

Figure 1B:
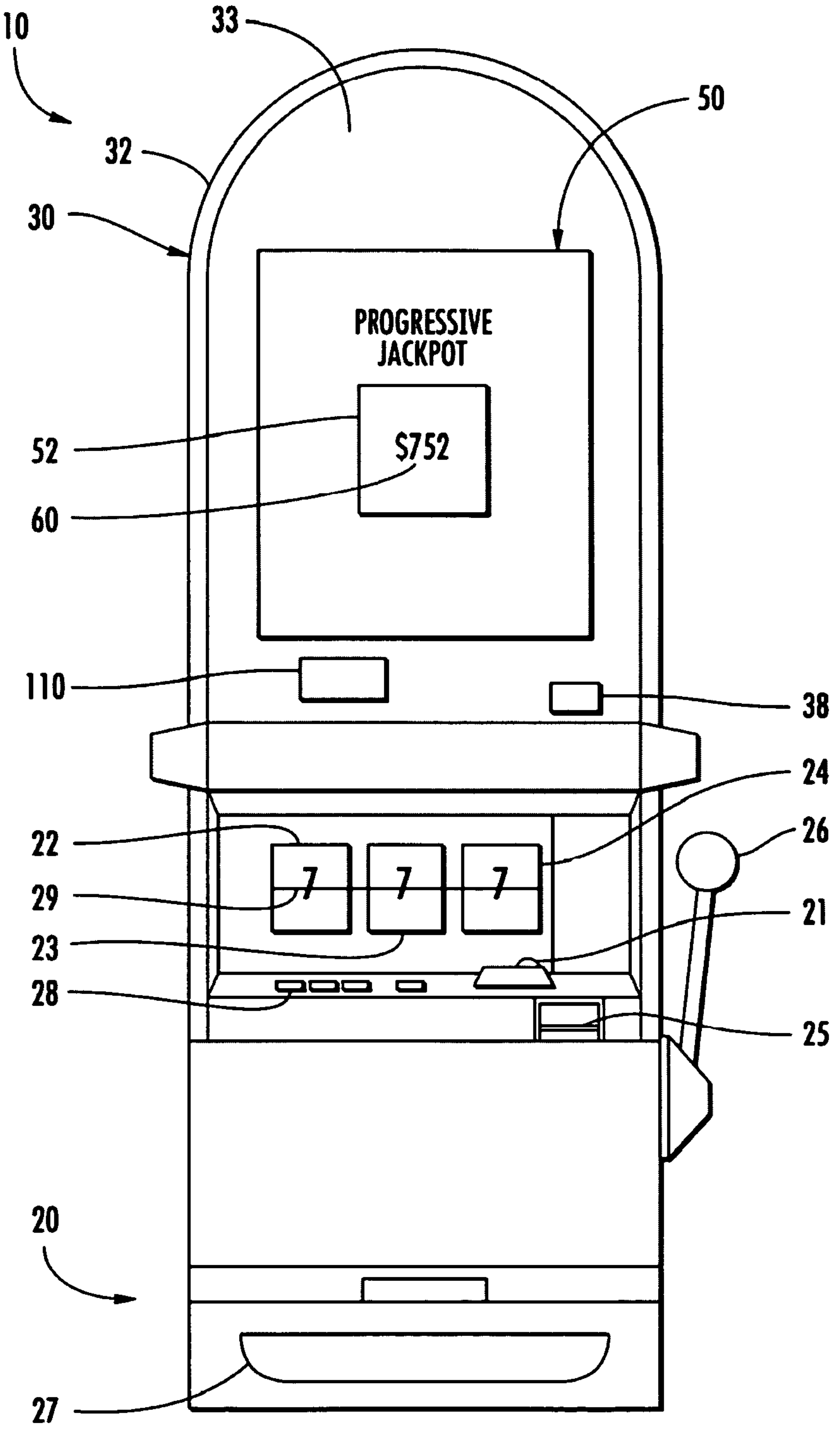
FIG. 1B is substantially a front view of a FIG. 1A showing a possible game display.

For example, assume that the total wagered amount is $100 and that server 160 randomly selects the percentage to contribute to the progressive jackpot to be 2%. The contribution amount would be $2.00 and the contribution amount of $2.00 would be deducted from the total amount wagered and added to the progressive jackpot 52 award value 60. As shown in FIG. 1B, progressive jackpot 52 is shown with a new award value 60 of $752.

Figure 1C:
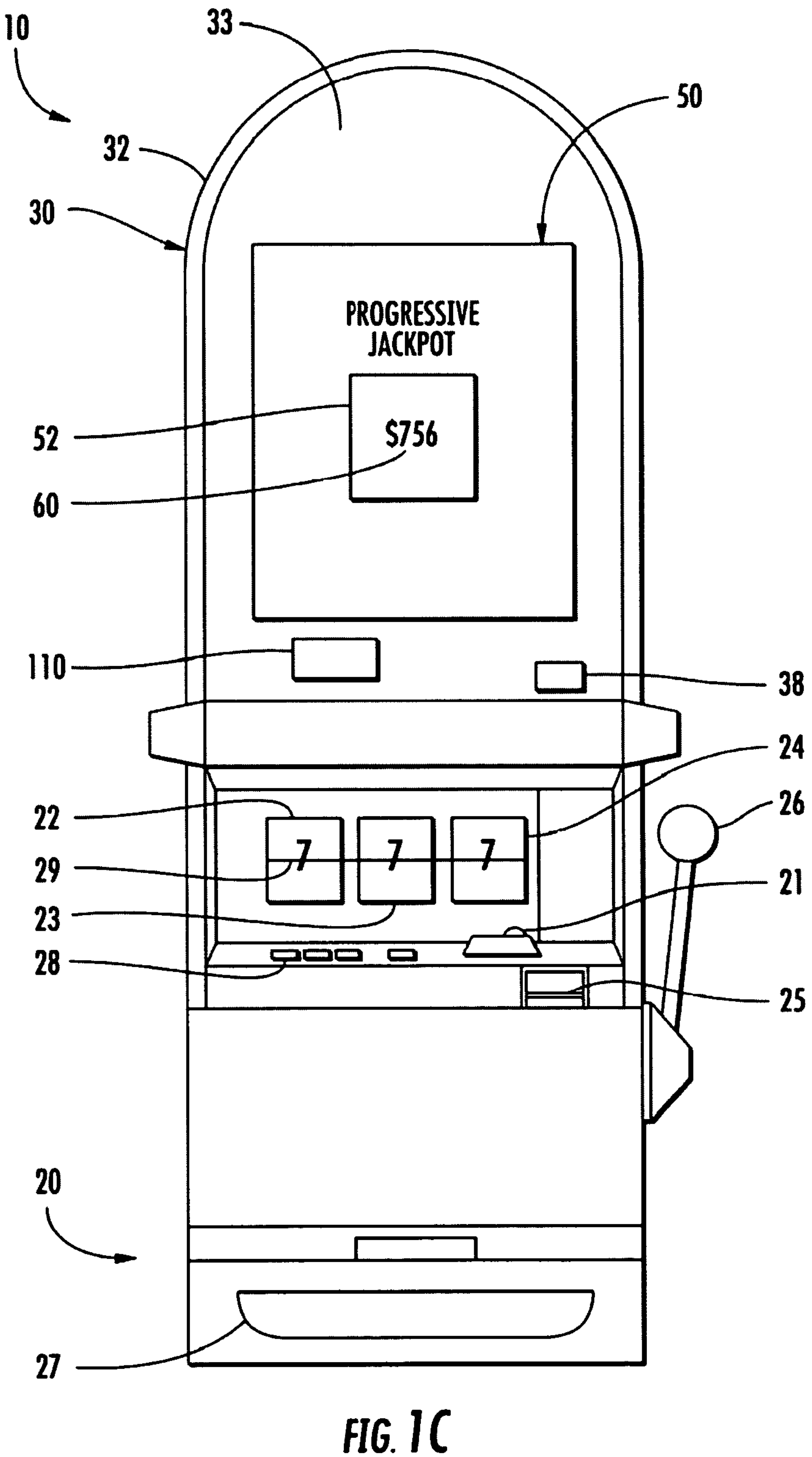
FIG. 1C is substantially a front view of a FIG. 1A showing another possible game display.

During another game cycle, server 160 could randomly select 4% of the wagers to be deducted and added to progressive jackpot 52. Again assume that the total wagered amount is $100 and that server 160 randomly selects the percentage to contribute to the progressive jackpot to be 4%. The new contribution amount of $4.00 would be deducted from the total amount wagered and added to progressive jackpot 52 award value 60. As shown in FIG. 1C, progressive jackpot 52 is shown with a new award value 60 of $756. This process can be repeated until progressive jackpot 52 is won or awarded.

In one embodiment, controller 76 or server 160 can randomly select the contribution amount or portion of the total amount wagered to be apportioned as a contribution amount and added to the progressive jackpot 52.

The contribution amount can be with a range of contribution amounts so that the amount taken from the total amount wagered is a reasonable amount and Is not too large or small a fraction of the total amount wagered. In an embodiment, the range of contribution amounts can be from $1.00 to $10.00.

For example, assume that the total wagered amount is $100 and that server 160 randomly selects the contribution amount to contribute to the progressive jackpot to be $2.00. The contribution amount would be $2.00 and the contribution amount of $2.00 would be deducted from the total amount wagered and added to the progressive jackpot 52 award value 60. As shown in FIG. 1B, progressive jackpot 52 is shown with a new award value 60 of $752.

During another game cycle, server 160 could randomly select $4.00 as the contribution amount. The new contribution amount of $4.00 would be deducted from the total amount wagered and added to progressive jackpot 52 award value 60. As shown in FIG. 1C, progressive jackpot 52 is shown with a new award value 60 of $756. This process can be repeated until progressive jackpot 52 is won or awarded.

With continued reference to FIGS. 1A, 2 and 3, controller 76 or server 160 is also adapted to detect or determine when a progressive jackpot awarding or qualifying event occurs in at least one of gaming devices 20. This may be accomplished by controller 82 transmitting a signal to controller 76 or server 160 that a progressive jackpot awarding or qualifying event has occurred. For example, controller 82 may determine the outcome of each game and when a progressive jackpot qualifying event outcome occurs, it transmits a signal to controller 76 or server 160. Alternatively, controller 76 or server 160 may periodically interrogate controller 82.

In another embodiment, one or more sensors may be provided for determining if a progressive jackpot qualifying event has occurred. For example, sensors 84-86 may sense the positions of reels 22-24. When reels 22-24 are in a progressive jackpot qualifying event activating position, controller 76 would sense this position and begin a progressive game sequence (described below).

Controllers 76A-D or 82A-D can each inform server 160 that a progressive jackpot qualifying event has occurred in gaming apparatuses 10A-D. Alternatively, server 160 may determine when a jackpot qualifying event occurs and transmit a signal to one of controllers 76A-D.

When controller 76 or server 160 detects a progressive jackpot qualifying event or is informed of a progressive jackpot qualifying event, it may begin a progressive jackpot sequence by activating display 110. Display 110 may comprise many different kinds of display devices, such as video screens, lights, light emitting diodes, etc. Display 110 may comprise its own controller that is adapted to generate a variety of displays.

Display 110 may indicate that a player has qualified for a progressive jackpot and prompt the player to perform an action. In an embodiment, the player is prompted to start the award sequence by pressing input device 38. Input device 38 may be a simple button, a keyboard, or a touch screen display.

When controller 76 or server 160 detects input device 38 being activated, progressive jackpot 52 may be indicated as being won and the award value 60 contained by progressive jackpot 52 can be awarded to the player. Controller 76 causes display 50 to indicate that progressive jackpot 52 has been won. An indicator such as an arrow (not shown) may be illuminated or flashed above the progressive jackpot to be awarded in order for a game player to clearly see what they have won.

Controller 76 or server 160 may then cause display 110 to display the total prize, if any, that the player has won. Other effects may also be presented, such as pre-recorded sound from speakers. If the actual prize is money, the amount of the prize may be added to the player's credit meter or dispensed.

Server 160 then updates displays 50A-D on each of gaming devices 10A-D with at least one new progressive award value. For example, primary progressive jackpot 52 on displays 50A-D maybe set to zero and would then start accumulating value as the progressive jackpot is funded through a portion of wagers from game play on primary gaming devices 20A-D.

It is also possible to replace the primary display of a gaming device with bonus gaming device 30. In other words bonus gaming device 30 can also be used as a primary or base game apparatus.

Game Method

Figure 4:
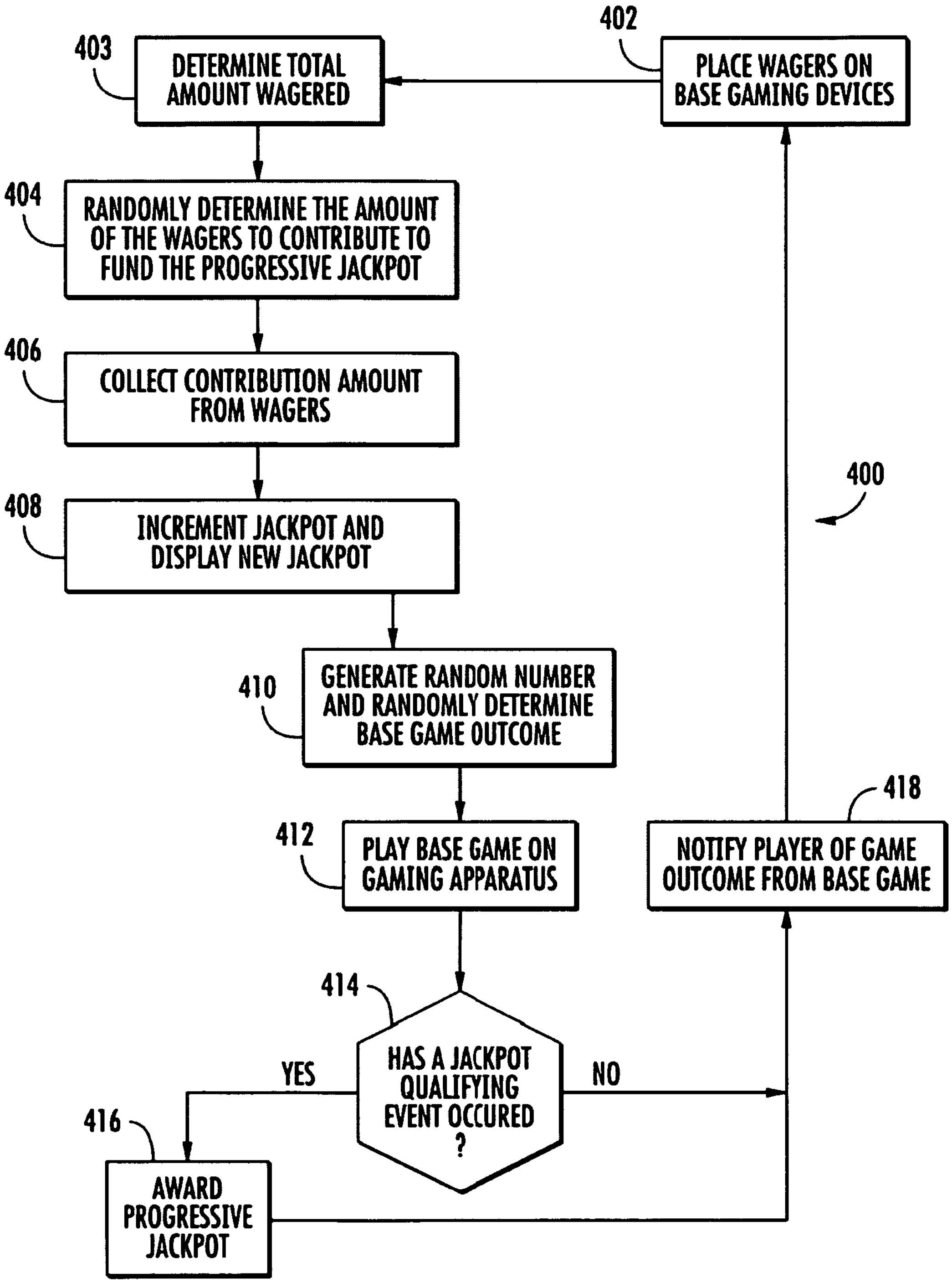
FIG. 4 is substantially a flowchart of a gaming method of the present invention.

Referring now to FIGS. 1A, 3 and 4, a flowchart of a method of game play 400 using gaming apparatuses 10 and network 150 is shown. At step 402, a player may initiate game play method 200 by placing a wager on one of gaming apparatuses 10 having a base or primary game 20. The wager may be in form of cash or credit from actual domestic or foreign currency, vouchers, coupons, tickets, electronic cards, and other sources or forms of wagers known in the art.

Once the player places a wager, server 160 determines the total amount wagered on all primary gaming devices 20A-D in network 150 at step 403. At step 404, server 160 randomly determines the contribution amount of the total amount wagered to be contributed or added to fund the progressive jackpot. The contribution amount can be a specific amount or can be a percentage of the total amount wagered.

The contribution amount is collected, apportioned or deducted from the total amount wagered at step 406. Next, method 400 proceeds to step 408 where the contribution amount is added to progressive jackpot 52 and the new award value 60 of progressive jackpot 52 is displayed.

The base or primary game random number generator generates a first random number and randomly determines the primary or base game outcome at step 410. Next, the player may play a base or primary gaming device 20 at step 412.

At decision 414, controller 76 or server 160 checks for the occurrence of a jackpot qualifying or awarding event. If the controller or server does not detect a jackpot awarding event, method 400 proceeds to step 418.

If the controller or server detects or determines a jackpot awarding event at decision step 414, the progressive jackpot is awarded at step 416. Next method 400 proceeds to step 418 where the player is notified of the game outcome from the base or primary game. Method 400 then returns to step 402 where the player may place another wager and play at least one of gaming apparatuses 10 again.

The steps shown in the flowchart do not necessarily imply that the steps have to take place in a particular order. The order of steps may be varied; some steps may be eliminated; and, some steps may be replaced with other steps. Such variations still fall within the scope of the invention.

Progressive Jackpot Game With Funding Meter

Figure 5:
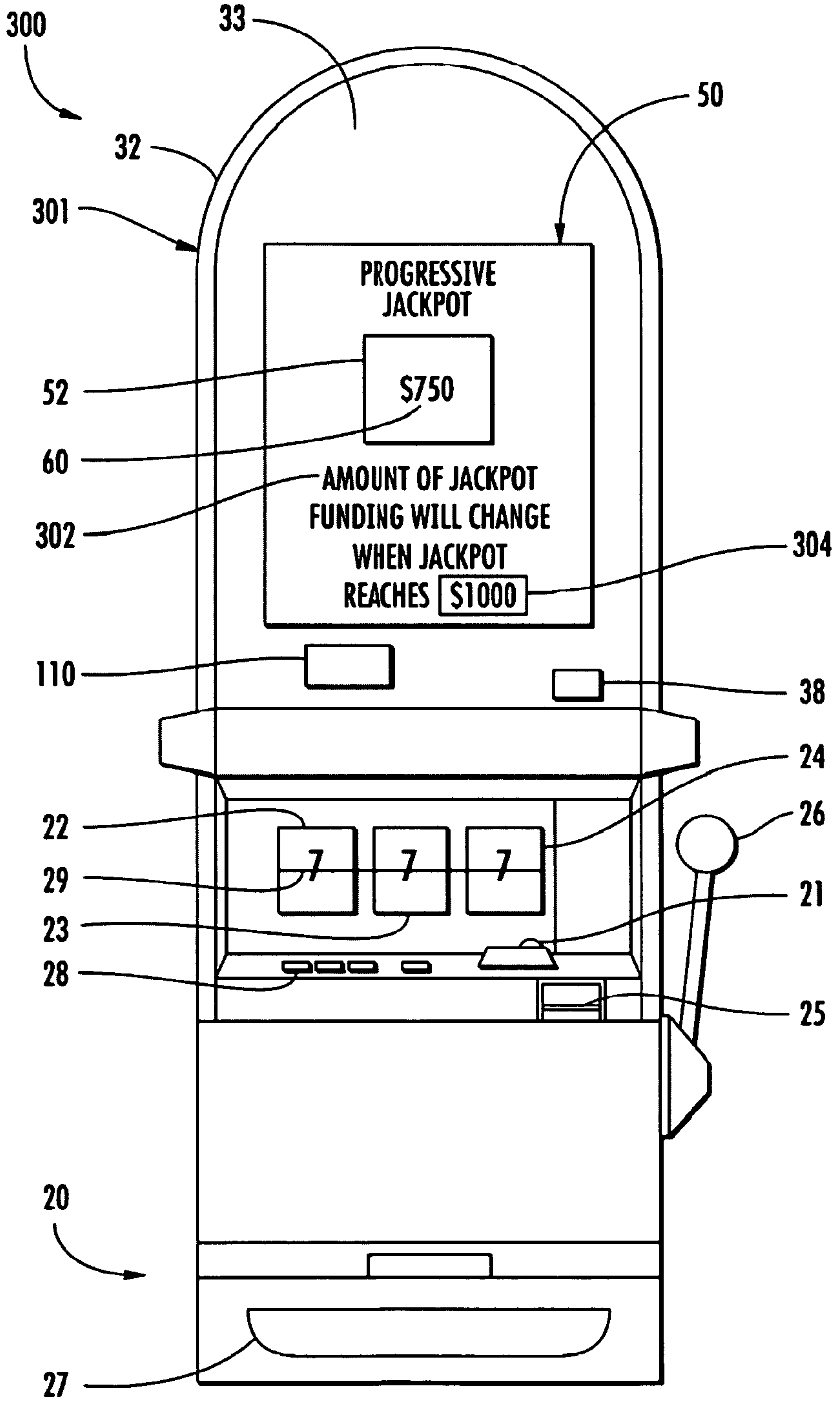
FIG. 5 is substantially a front view of another embodiment of the present invention.

With reference now to FIG. 5, another embodiment of a gaming apparatus 300 in accordance with the present invention is shown. Gaming apparatus 300 can have a progressive jackpot gaming device 301. Several gaming apparatuses 300 can be connected in a network 150 (FIG. 3) in the same manner described for gaming apparatuses 10.

Gaming apparatus 300 is similar to gaming apparatuses 10 except that the progressive jackpot funding or contribution remains the same for each game cycle until a triggering event or progressive jackpot funding changing event occurs. In FIG. 5, the triggering event to vary or change the contribution amount to progressive jackpot 52 is when the award value 60 reaches or exceeds a certain pre-determined value. The pre-determined value may be randomly selected or may be fixed by server 160 (FIG. 3).

Gaming apparatus 300 has an information set 302 that can inform the game player about various operating parameters of gaming apparatus 300. In FIG. 5, information set 302 reads, "Amount of Jackpot Funding Will Change when the Jackpot Reaches . . . ". A funding meter 304 is displayed on display 50 showing the amount that award value 60 has to reach until the funding of progressive jackpot 52 is varied or changed. When the award value 60 reaches $1000, controller 76 or server 160 will determine a new contribution amount to be deducted from all of the wagers placed and added to increase progressive jackpot 52.

The contribution amount or percentage may then remain the same for a few or many game cycles until the next triggering event occurs. Controller 76 or server 160 is adapted to detect or determine when the triggering event or jackpot funding event occurs.

For example, in one embodiment, the contribution amount may be $2.00 for each game cycle that the primary game 20 completes. During each game cycle, $2.00 may be added to the award value 60 of progressive jackpot 52. When a triggering event occurs, the contribution amount may be varied or changed to $4.00 for each game cycle that the primary game 20 completes. During each game cycle, $4.00 can then be added to the award value 60 of progressive jackpot 52.

After the award value 60 has reached the predetermined value shown on funding meter 304, controller 76 or server 160 may reset funding meter 304 to a new award value. For example, funding meter 304 could be reset to a value larger than the current award value 60 of progressive jackpot 52. In one embodiment the amount added to funding meter 304 to determine when the jackpot funding will next change may be a fixed amount. In another embodiment the amount added to funding meter 304 to determine when the jackpot funding will next change may be randomly selected.

Players playing gaming apparatus 300 will feel a sense of excitement and anticipation as they view funding meter 304 knowing that soon the funding or contribution amount to the progressive jackpot will change.

Progressive Jackpot Game With Funding Timer

Figure 6:
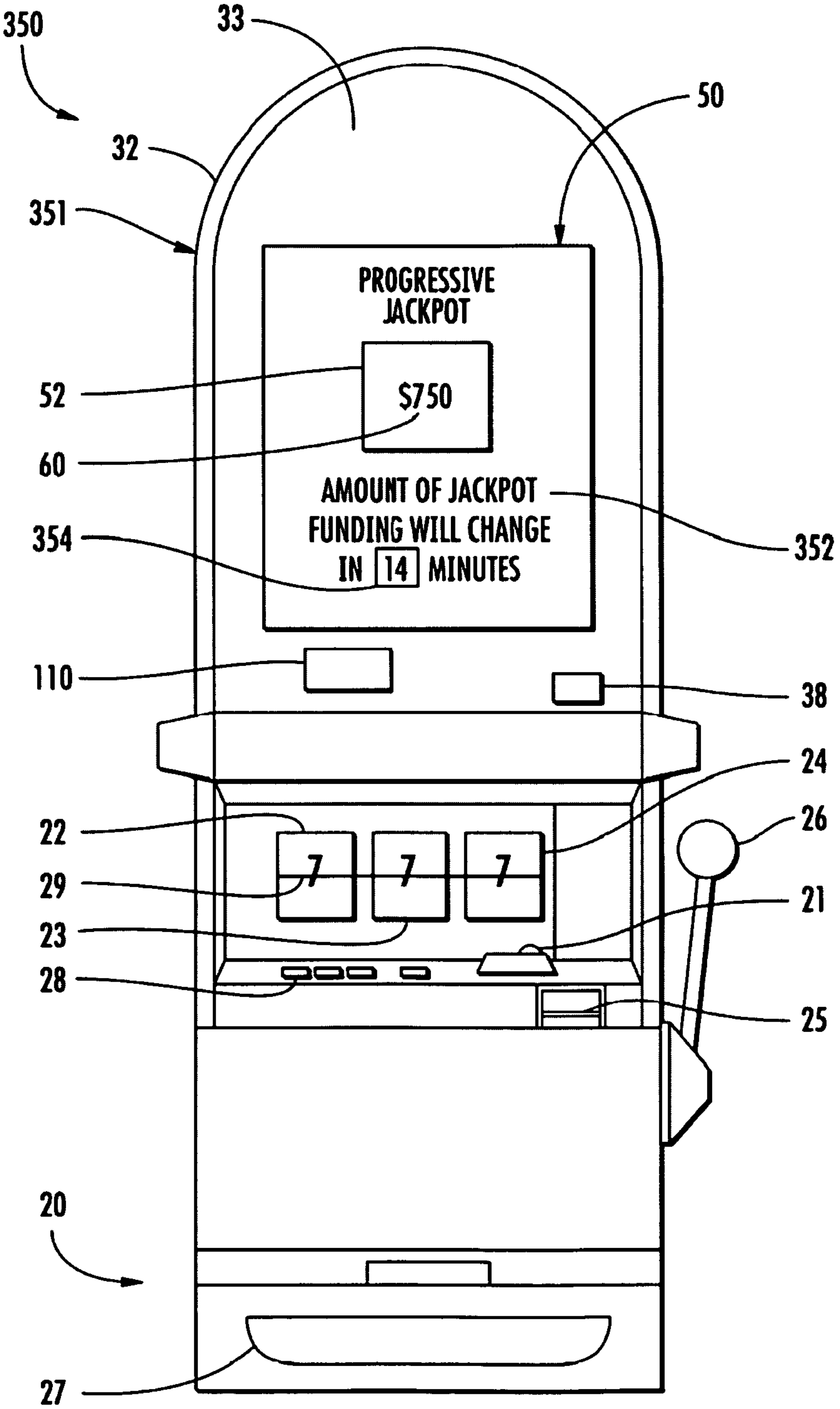
FIG. 6 is substantially a front view of an additional embodiment of the present invention.

With reference now to FIG. 6, another embodiment of a gaming apparatus 350 in accordance with the present invention is shown. Gaming apparatus 350 can have a progressive jackpot gaming device 351. Several gaming apparatuses 350 can be connected in a network 150 (FIG. 3) in the same manner described for gaming apparatuses 10.

Gaming apparatus 350 is similar to gaming apparatuses 10 except that the progressive jackpot funding or contribution remains the same for each game cycle until a triggering event or progressive jackpot funding changing event occurs. In FIG. 6, the triggering event to vary or change the contribution amount to progressive jackpot 52 is when a time period or period of time has expired. The time period may be randomly selected or may be pre-determined by server 160 (FIG. 3).

Gaming apparatus 300 has an information set 352 that can inform the game player about various operating parameters of gaming apparatus 350. In FIG. 6, information set 352 reads, "Amount of Jackpot Funding Will Change in __________ minutes". A funding timer 354 is displayed on display 50 showing the amount of time remaining until the funding of progressive jackpot 52 is varied or changed. Funding timer 354 is shown indicating that 14 minutes remain until the jackpot funding or contribution amount is varied or changed. When the timer reaches zero, controller 76 (FIG. 3) or server 160 (FIG. 3) will determine a new contribution amount to be deducted from all of the wagers placed and added to increase progressive jackpot 52.

The contribution amount or percentage may then remain the same for a few or many game cycles until the next triggering event occurs. Controller 76 or server 160 is adapted to operate fending timer 354 and to detect or determine when the triggering event or jackpot funding event occurs.

For example, in one embodiment, the contribution amount may be $2.00 for each game cycle that the primary game 20 completes. During each game cycle, $2.00 may be added to the award value 60 of progressive jackpot 52. When a triggering event occurs such as the time period ending, the contribution amount may be varied or changed to $4.00 for each game cycle that the primary game 20 completes. During each game cycle, $4.00 can then be added to the award value 60 of progressive jackpot 52.

After the time period has expired, controller 76 or server 160 may reset funding timer 354 to a new time period. For example, funding timer 354 could be reset to vary the jackpot funding in 30 minutes. The time period shown by funding timer 354 may be fixed or may be randomly selected.

Players playing gaming apparatus 350 will feel a sense of excitement and anticipation as they view funding timer meter 354 knowing that soon the funding or contribution amount to the progressive jackpot will change.

Game Method Using Progressive Jackpot Game With Funding Meter or Timer

Figure 7:
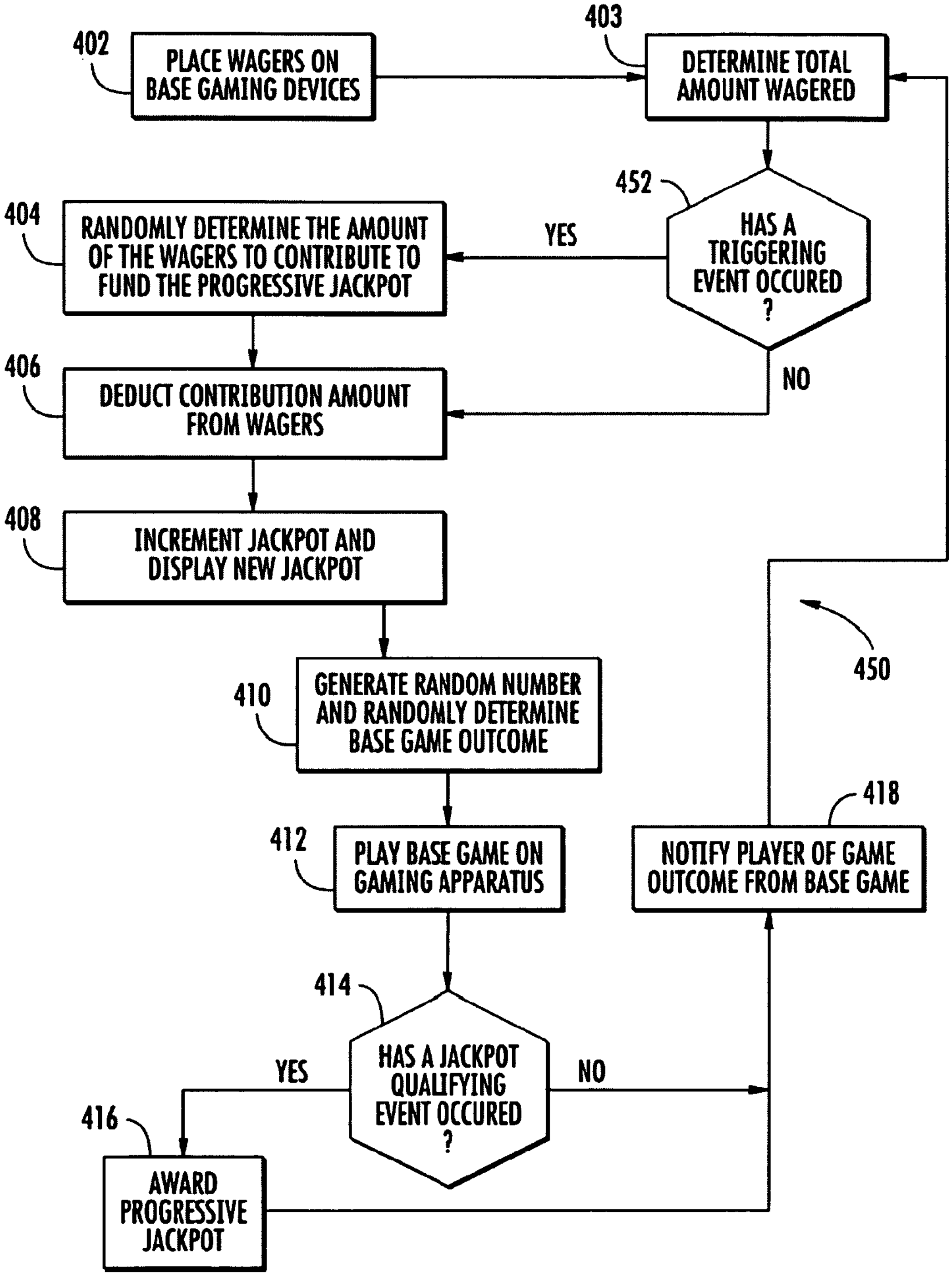
FIG. 7 is substantially a flowchart of a gaming method of the present invention.

Referring now to FIGS. 5, 6 and 7, a flowchart of a method of game play 450 using gaming apparatuses 300 and network 150 (FIG. 3) or gaming apparatuses 350 and network 150 is shown. Gaming method 450 may be used with either gaming apparatus 300 or 350. At step 402, a player may initiate game play method 200 by placing a wager on one of gaming apparatuses 300 or 350 having a base or primary game 20. The wager may be in form of cash or credit from actual domestic or foreign currency, vouchers, coupons, tickets, electronic cards, and other sources or forms of wagers known in the art.

Once the player places a wager, server 160 determines the total amount wagered on all primary gaming devices 20A-D in network 150 at step 403. At decision 452, server 160 checks to see if a triggering event has occurred. In gaming apparatus 300, the triggering event is when the progressive jackpot award value 60 is equal to or reaches the value of the funding meter 304. In gaming apparatus 350, the triggering event is when the funding timer 354 counts down to zero.

If a triggering event has not occurred at step 452, method 450 proceeds to step 406 where the previous contribution amount is deducted born the total amount wagered. If a triggering event has occurred at decision step 452, method 450 proceeds to step 404. At step 404, server 160 randomly determines the new contribution amount of the total amount wagered to be contributed or added to fund the progressive jackpot. The contribution amount can be a specific amount or can be a percentage of the total amount wagered. At step 404, the funding meter 304 or the funding timer 354 may also be reset.

The contribution amount is collected, apportioned or deducted from the total amount wagered at step 406. Next, method 400 proceeds to step 408 where the contribution amount is added to progressive jackpot 52 and the new award value 60 of progressive jackpot 52 is displayed.

The base or primary game random number generator generates a first random number and randomly determines the primary or base game outcome at step 410. Next, the player may play a base or primary gaming device 20 at step 412.

At decision 414, controller 76 or server 160 checks for the occurrence of a jackpot qualifying or awarding event. If the controller or server does not detect a jackpot awarding event, method 400 proceeds to step 418.

If the controller or server detects or determines a jackpot awarding event at decision step 414, the progressive jackpot is awarded at step 416. Next method 400 proceeds to step 418 where the player is notified of the game outcome from the base or primary game. Method 400 then returns to step 402 where the player may place another wager and play at least one of gaming apparatuses 300 or 350 again.

The steps shown in the flowchart do not necessarily imply that the steps have to take place in a particular order. The order of steps may be varied; some steps may be eliminated; and, some steps may be replaced with other steps. Such variations still fall within the scope of the invention.

Progressive Jackpot Game Using Three or More Progressive Jackpots

Figure 8:
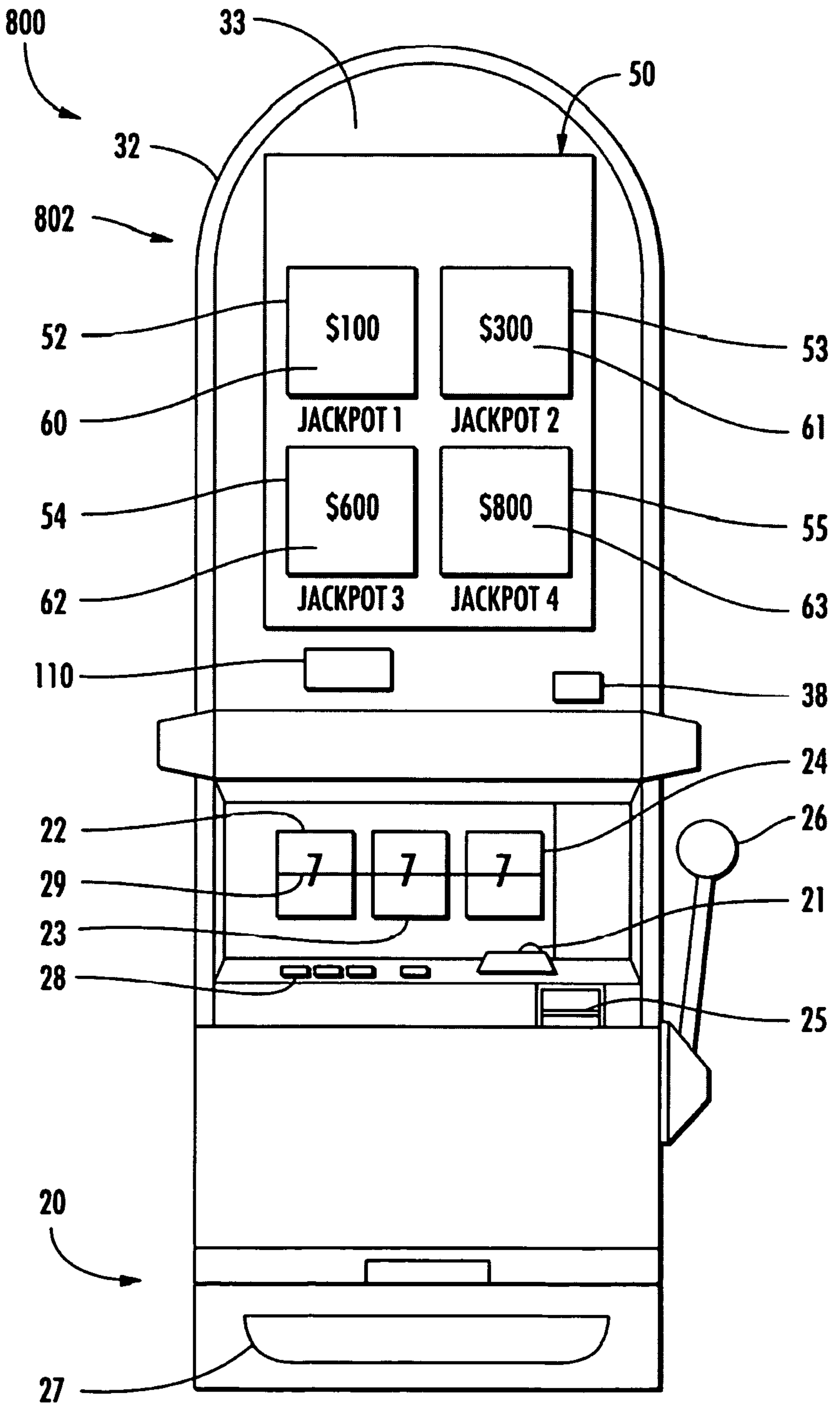
FIG. 8 is substantially a front view of another embodiment of a gaming apparatus in accordance with the present invention.

With reference now to FIG. 8, another embodiment of a gaming apparatus 800 in accordance with the present invention is shown. Gaming apparatus 800 is similar to gaming apparatus 10 except that instead of one progressive jackpot, gaming apparatus 800 has four progressive jackpots. Gaming apparatus 800 has a primary or base gaming device 20 and a progressive jackpot gaming device 802. Progressive jackpot gaming device 802 has a video display 50 that is shown displaying font progressive jackpots. Progressive jackpots 52, 53, 54 and 55 are shown in separate areas of display 50. Alternatively, progressive jackpots 52-55 could be shown on separate LED meters or separate video displays. Several gaming apparatuses 800 may be connected in a network of gaming apparatuses 150 (FIG. 3) in the same manner previously described for gaming apparatuses 10A-D.

Progressive jackpot 52 is labeled, "Jackpot 1", progressive jackpot 53 is labeled, "Jackpot 2", progressive jackpot 54 is labeled, "Jackpot 3" and progressive jackpot 55 is labeled, "Jackpot 4". Progressive Jackpots 52-55 each have an associated progressive jackpot award value that can be awarded to a player as a prize. Progressive jackpot 52 has an award value 60 shown as, "$100". Progressive jackpot 53 has an award value 61 shown as, "$300". Progressive jackpot 54 has an award value 62 shown as, "$600". Progressive jackpot 55 has an award value 63 shown as, "$800".

A game player playing gaming apparatus 800 may be awarded one, two, three or all of progressive jackpots 52-55. In an embodiment, one or more of award values 60-63 may be a hidden or mystery progressive jackpots wherein the award value of the progressive jackpot is not revealed to the game player until after the progressive jackpot has been won.

Progressive Jackpots 52-55 can be funded in a variable or changing manner. In one embodiment, the progressive jackpot funding amount or contribution amount is fixed, but the entire contribution amount is added to one of the progressive jackpots 52-55 that are randomly selected.

In another embodiment, the progressive jackpot funding amount or contribution amount is fixed, but the contribution amount is divided or allocated between two or more of the progressive jackpots 52-55. The percentage of the contribution amount added to each of the progressive jackpots can be randomly selected.

In an additional embodiment, two levels of random selection can be used to determine the progressive jackpot funding amount or contribution amount for each of the progressive jackpots. The contribution amount can be randomly determined and the percentage of the contribution amount added to each of the progressive jackpots 52-55 can be randomly selected.

In yet another embodiment, the progressive jackpots 52-55 may be funded upon the occurrence of triggering or jackpot funding event as determined by server 160 (FIG. 3).

In another embodiment, progressive jackpots 52-55 may be multi-level progressive jackpots that can only be won or awarded in sequence.

With reference now to FIGS. 3 and 8, controller 76 (FIG. 2) or server 160 can change and control the funding of progressive jackpots 52-55. Progressive jackpots 52-55 can be funded in a variable manner. During one game cycle or period, the wagers placed on all of the gaming apparatuses 800 in network 150 may be added to form a total wagered amount. Controller 76 or server 160 can then determine a fixed percentage or a fixed amount of the total amount wagered to be apportioned as a contribution amount. Server 160 may deduct the contribution amount from the total amount wagered and then randomly select one of the progressive jackpots 52-55 to add the contribution amount to.

For example, assume that the contribution amount is $10.00. Server 160 can randomly select one of progressive jackpots 52, 53, 54 or 55 to receive the entire contribution amount. Server 160 can randomly fund any of progressive jackpots 52-55. Server 160 can use a random number generator and table to determine which one of progressive jackpots 52-55 receives the entire contribution amount.

Figure 9:
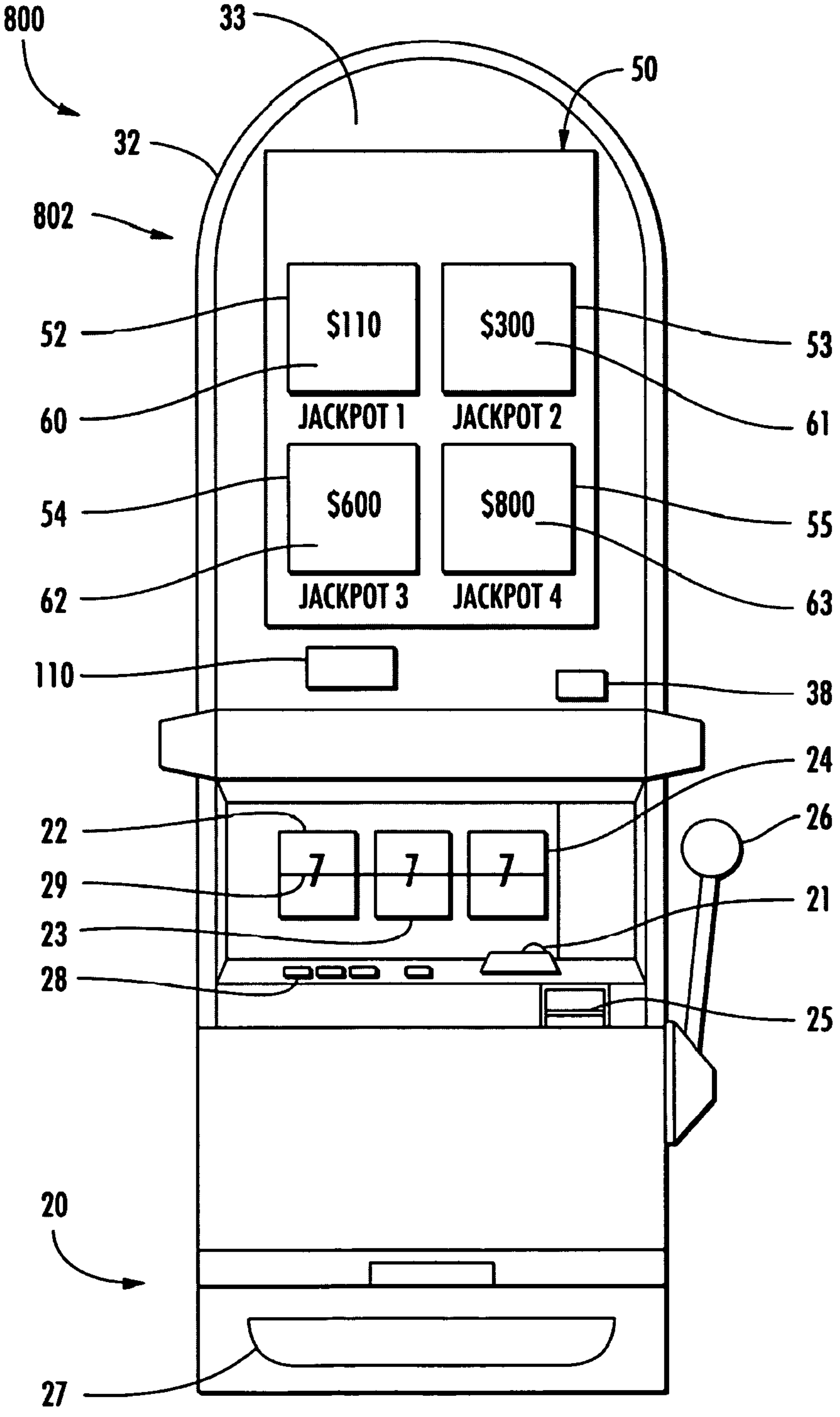
FIG. 9 is substantially a front view of FIG. 8 showing one possible game display.

Turning now to FIG. 9, server 160 has selected progressive jackpot 52 to receive the entire contribution amount of $10.00 and has added $10.00 to the previous award value 60 that was shown in FIG. 8. Progressive jackpot 52 is shown with a new award value 60 of $110.00.

The funding of progressive jackpots 52-55 may change or vary every game cycle or may change upon the occurrence of triggering or jackpot funding event as determined by server 160.

In one embodiment, the contribution amount is fixed, but the contribution amount is randomly divided or allocated between two or more of the progressive jackpots 52-55. The percentage of the contribution amount added to each of the progressive jackpots can be randomly selected.

During one game cycle or period, the wagers placed on all of the gaming apparatuses 800 in network 150 may be added to form a total wagered amount. Server 160 can then determine a fixed percentage or a fixed amount of the total amount wagered to be apportioned as a contribution amount. Server 160 may deduct the contribution amount from the total amount wagered and then randomly divide the contribution amount among or between the progressive jackpots 52-55.

For example, assume that the contribution amount is $10.00. Server 160 can randomly split or allocate the contribution amount between progressive jackpots 52, 53, 54 or 55. Server 160 can use a random number generator to determine the allocation of the contribution amount between the progressive jackpots 52-55. Server 160 could allocate 20% of the contribution amount to progressive jackpot 52, 40% to progressive jackpot 53, 30% to progressive jackpot 54 and 10% to progressive jackpot 55.

Figure 10:
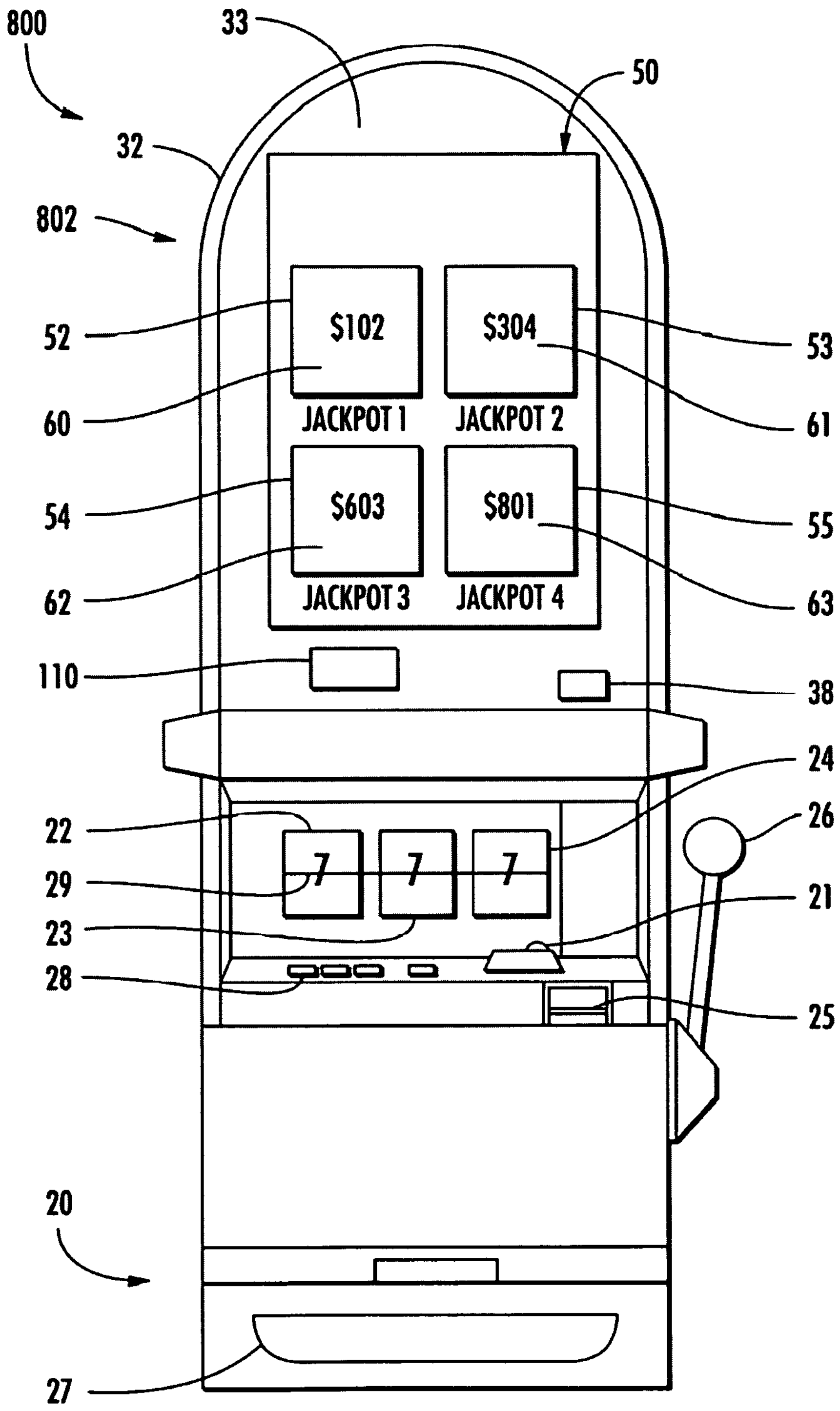
FIG. 10 is substantially a front view of FIG. 8 showing another possible game display.

Turning now to FIG. 10, server 160 has added $2.00 to progressive jackpot 52, $4.00 to progressive jackpot 53, $3.00 to progressive jackpot 54 and $1.00 to progressive jackpot 55. Progressive jackpot 52 is shown with a new award value 60 of $102.00. Progressive jackpot 53 is shown with a new award value 61 of $304.00. Progressive jackpot 54 is shown with a new award value 62 of $603.00 and progressive jackpot 55 is shown with a new award value 63 of $801.00.

The funding of progressive jackpots 52-55 may change or vary every game cycle or may be changed upon the occurrence of triggering or jackpot funding event as determined by server 160.

In another embodiment, two levels of random selection can be used to determine the contribution amount for each of the progressive jackpots. The contribution amount can be randomly determined and the percentage of the contribution amount added to each of the progressive jackpots 52-55 can be randomly selected.

During one game cycle or period, the wagers placed on all of the gaming apparatuses 800 in network 150 may be added to form a total wagered amount. Server 160 can then randomly select a percentage or amount of the total amount wagered to be apportioned as a contribution amount and then be split or divided progressive jackpots 52-55. Server 160 may use a random number generator to select the percentage.

The random percentage can be with a range of percentages so that the amount taken from the total amount wagered is a reasonable amount and is not too large or small a fraction of the total amount wagered. In an embodiment, the range of percentages can be from 1 to 20 percent.

The contribution amount can also be within a range of contribution amounts so that the amount taken from the total amount wagered is a reasonable amount and is not too large or small a fraction of the total amount wagered. In an embodiment, the range of contribution amounts can be from $1.00 to $50.00.

For example, assume that server 160 randomly selects the contribution amount to be $40.00. Server 160 may deduct the contribution amount from the total amount wagered and then randomly divide the contribution amount among or between the progressive jackpots 52-55.

Server 160 can randomly split or allocate the contribution amount between progressive jackpots 52, 53, 54 or 55. Server 160 can use a random number generator to determine the allocation of the contribution amount between the progressive jackpots 52-55. Server 160 could allocate 20% of the contribution amount to progressive jackpot 52, 40% to progressive jackpot 53, 30% to progressive jackpot 54 and 10% to progressive jackpot 55.

Figure 11:
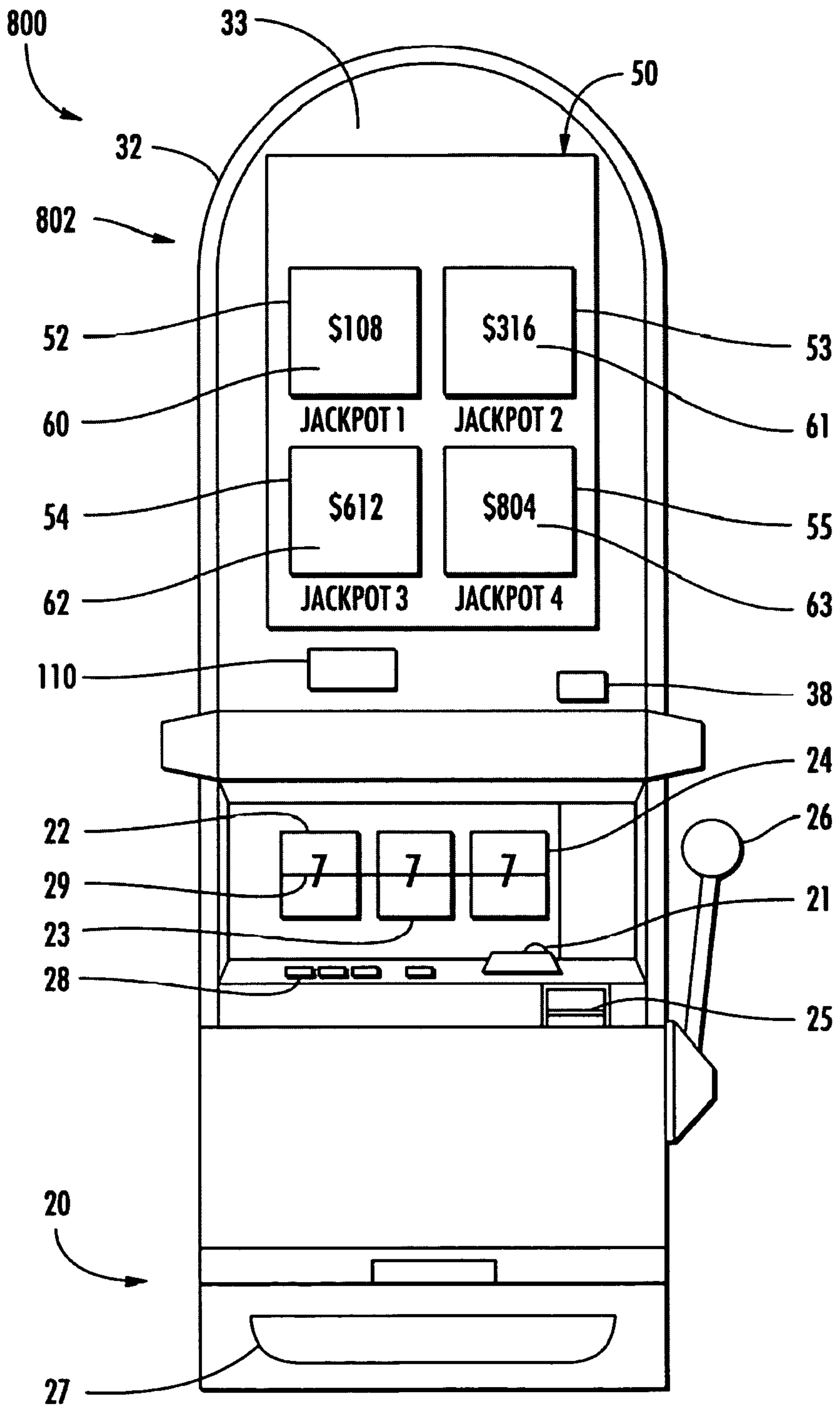
FIG. 11 is substantially a front view of FIG. 8 showing an additional possible game display.

Turning now to FIG. 11, server 160 has added $8.00 to progressive jackpot 52, $16.00 to progressive jackpot 53, $12.00 to progressive jackpot 54 and $4.00 to progressive jackpot 55. Progressive jackpot 52 is shown with a new award value 60 of $108.00. Progressive jackpot 53 is shown with a new award value 61 of $316.00. Progressive jackpot 54 is shown with a new award value 62 of $612.00 and progressive jackpot 55 is shown with a new award value 63 of $804.00.

The funding of progressive jackpots 52-55 may change or vary every game cycle or may be changed upon the occurrence of triggering or jackpot funding event as determined by server 160.

Players playing gaming apparatus 800 will feel a sense of excitement and anticipation as they view display 50 and see progressive jackpots 52-55 frequently changing the amount and timing of the funding and the amounts added to progressive jackpots 52-55. Game players playing gaming apparatus 800 see a non-static display that changes progressive jackpots 52-55 in a dynamic manner that is not predictable.

With reference to FIGS. 2, 3 and 8, controller 76 or server 160 is also adapted to detect or determine when a progressive jackpot awarding or qualifying event occurs in gaming apparatus 800. This may be accomplished by controller 82 (FIG. 2) transmitting a signal to controller 76 that a progressive jackpot qualifying event has occurred. For example, controller 82 may determine the outcome of each, game and when a progressive jackpot qualifying event outcome occurs, it transmits a signal to controller 76. Alternatively, controller 76 may periodically interrogate controller 82. In another embodiment, one or more sensors may be provided for determining if a progressive jackpot qualifying event has occurred. For example, sensors 84-86 may sense the positions of reels 22-24. When reels 22-24 are in a progressive jackpot qualifying event activating, position, controller 76 would sense this position and begin a progressive game sequence (described below).

Controllers 76A-D or 82A-D can each inform server 160 (FIG. 3) that a progressive jackpot qualifying event has occurred in one of gaming apparatuses 300 connected in a network 150. Alternatively, server 160 may determine when a jackpot qualifying event occurs and transmit a signal to one of controllers 76A-D.

When server 160 detects a progressive jackpot qualifying event or is informed of a progressive jackpot qualifying event; it may begin a progressive jackpot sequence by activating display 110. Display 110 may comprise many different kinds of display devices, such as video screens, lights, light emitting diodes, etc. Display 110 may comprise its own controller that is adapted to generate a variety of displays.

Display 110 may indicate that a player has qualified for a progressive jackpot and prompt the player to perform an action. In an embodiment, the player is prompted to start the award sequence by pressing input device 38. Input device 38 may be a simple button, a keyboard, or a touch screen display.

In an embodiment either one of progressive jackpots 52, 53, 54, 55, a combination of progressive jackpots 52-55 or all of progressive jackpots 52-55 can be awarded. When server 160 detects input device 38 being activated, server 160 performs a routine to determine which of the progressive jackpots will be awarded. In an embodiment, the progressive jackpots to be awarded are randomly selected. A random number generator generates a random number and supplies the random number to server 160. Server 160 compares the random number to a pay table similar to that described for gaming device 20 or as described in U.S. Pat. No. 5,823,874, issued to Adams. A simple pay table may appear as follows:

TABLE 1

| Random Number | Award |
|---|---|
| 0.00 to 0.05 | Jackpot 1 |
| 0.06 to 0.35 | Jackpot 2 |
| 0.36 to 0.65 | Jackpot 3 |
| 0.66 to 0.90 | Jackpot 4 |
| 0.91 to 0.92 | Jackpots 1 and 2 |
| 0.93 to 0.94 | Jackpots 2 and 3 |
| 0.95 to 0.96 | Jackpots 3 and 4 |
| 0.96 to 0.97 | Jackpots 1 and 4 |
| 0.97 to 0.98 | Jackpots 2 and 4 |
| 0.98 to 0.985 | Jackpots 1, 2 and 3 |
| 0.985 to 0.99 | Jackpots 1, 3 and 4 |
| 0.99 to 0.999 | Jackpots 2, 3 and 4 |
| 0.999 to 1.00 | Jackpots 1, 2, 3 and 4 |

For example, if the random number generator produced 0.999, progressive jackpots 1-4 (52-55) would be indicated as being won and the award values 60, 61, 62 and 63 contained by progressive jackpots 52-55 would be added and awarded to the player.

If the random number generator produced 0.32, progressive jackpot 2 (53) would be indicated as being won and the award value 61 contained by progressive jackpot 2 would be awarded to the player. This embodiment is not necessarily limited to the example pay table shown. A larger or fewer number of progressive jackpots may be used.

Once server 160 randomly determines which progressive jackpots are to be awarded, server 160 causes display 50 to indicate the progressive jackpot or jackpots that have been won. An indicator such as an arrow (not shown) may be illuminated or flashed above the progressive jackpots to be awarded in order for a game player to clearly see what they have won. At the same time, the award values for the progressive jackpots that were not won may be removed from display 50 in order to eliminate any confusion as to which progressive jackpots have been won.

Server 160 may then cause display 110 to display the total prize, if any, that the player has won. The amount of each progressive jackpot won may be added by server 160 and then shown on display 110. Other effects may also be presented, such as pre-recorded sound from speakers. If the actual prize is money, the amount of the prize may be added to the player's credit meter or dispensed.

Gaming apparatus 800 may also be used with multi-level progressive jackpots. In a multi-level progressive jackpot game, several progressive jackpots are provided that are in a particular order and game players must win each jackpot in sequence before they are eligible to win the next progressive jackpot.

Game Method Using Three or More Progressive Jackpots

Figure 12:
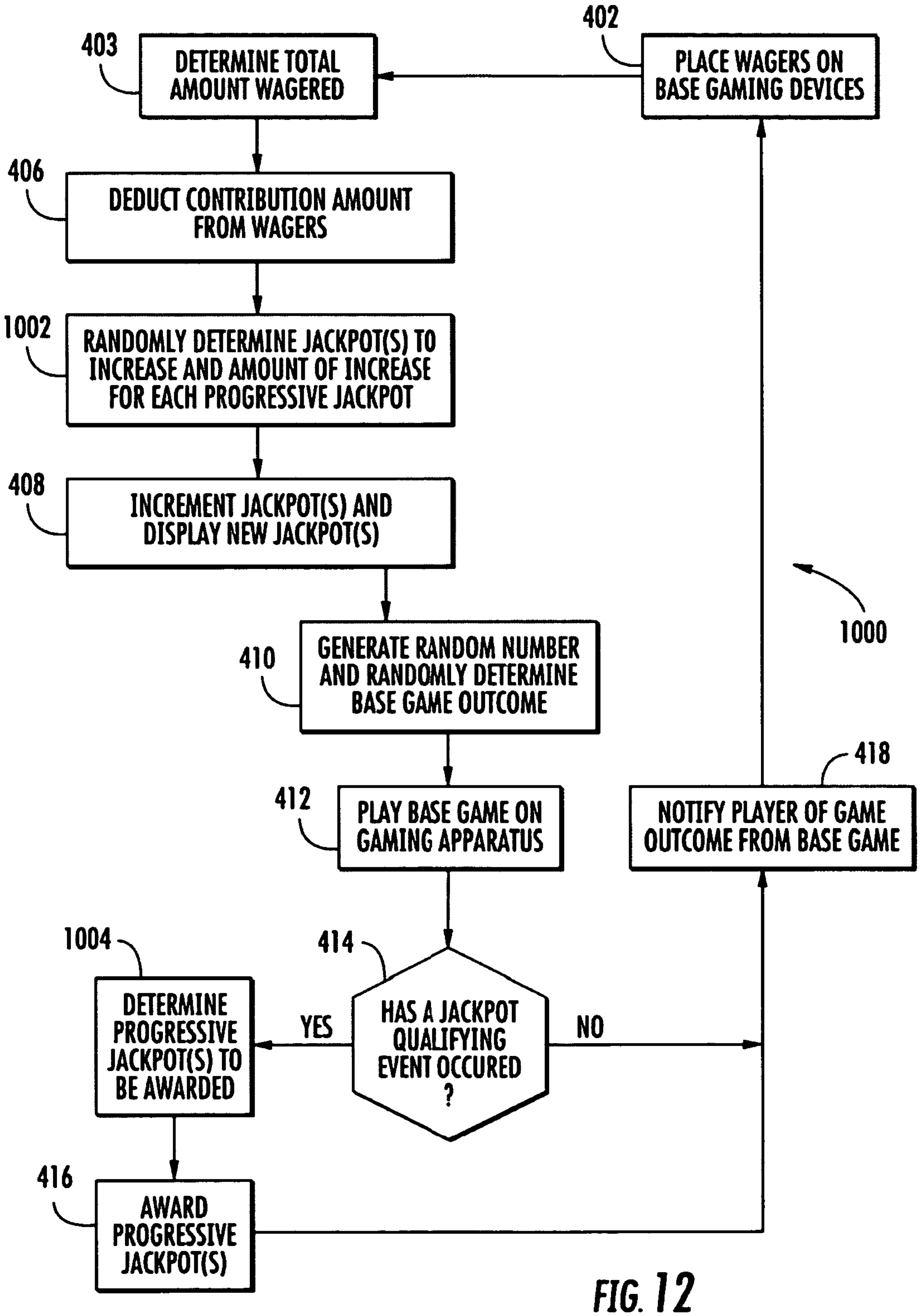
FIG. 12 is substantially a flowchart of a gaining method of the present invention using the gaming apparatus of FIG. 8.

Referring now to FIGS. 8, 3 and 12, a flowchart of a method of game play 1000 using gaming apparatuses 800 and network 150 (FIG. 3) is shown. At step 402, a player may initiate game play method 1000 by placing a wager on one of gaming apparatuses 800 having a base or primary game 20. The wager may be in form of cash or credit from actual domestic or foreign currency, vouchers, coupons, tickets, electronic cards, and other sources or forms of wagers known in the art.

Once the player places a wager, server 160 determines the total amount wagered on all primary gaming devices 20 in network 150 at step 403. The contribution amount is collected, apportioned or deducted from the total amount wagered at step 406.

At step 1002, server 160 divides or splits the contribution amount among or between progressive jackpots 52-55. A portion of the contribution amount can be added to each of the progressive jackpots or all of the contribution amount may be added to one of the progressive jackpots. Server 160 randomly determines which of progressive jackpot 52-55 to increase and the amount of the increase or increase amount for each of the progressive jackpots 52-55.

Next, method 1000 proceeds to step 408 where each of the progressive jackpot increase amounts are added to progressive jackpots 52-55, respectively and the new award values 60-63 are displayed.

The base or primary game random number generator generates a first random number and randomly determines the primary or base game outcome at step 410. Next, the player may play a base or primary gaming device 20 at step 412.

At decision 414, controller 76 or server 160 checks for the occurrence of a jackpot qualifying or awarding event. If the controller or server does not detect a jackpot awarding event, method 400 proceeds to step 418.

If the controller or server detects or determines a jackpot awarding event at decision step 414, method 1000 proceeds to step 1004, where server 160 determines which of progressive jackpot 52-55 are to be awarded. Server 160 may award 1, 2, 3 or all of progressive jackpots 52-55 as prize. At least one of progressive jackpots 52-55 are awarded to the player at step 416.

Next method 1000 proceeds to step 418 where the player is notified of the game outcome from the base or primary game. Method 1000 then returns to step 402 where the player may place another wager and play at least one of gaming apparatuses 800 again.

The steps shown in the flowchart do not necessarily imply that the steps have to take place in a particular order. The order of steps may be varied; some steps may be eliminated; and, some steps may be replaced with other steps. Such variations still fall within the scope of the invention.

Alternative Game Method Using Three or More Progressive Jackpots

Figure 13:
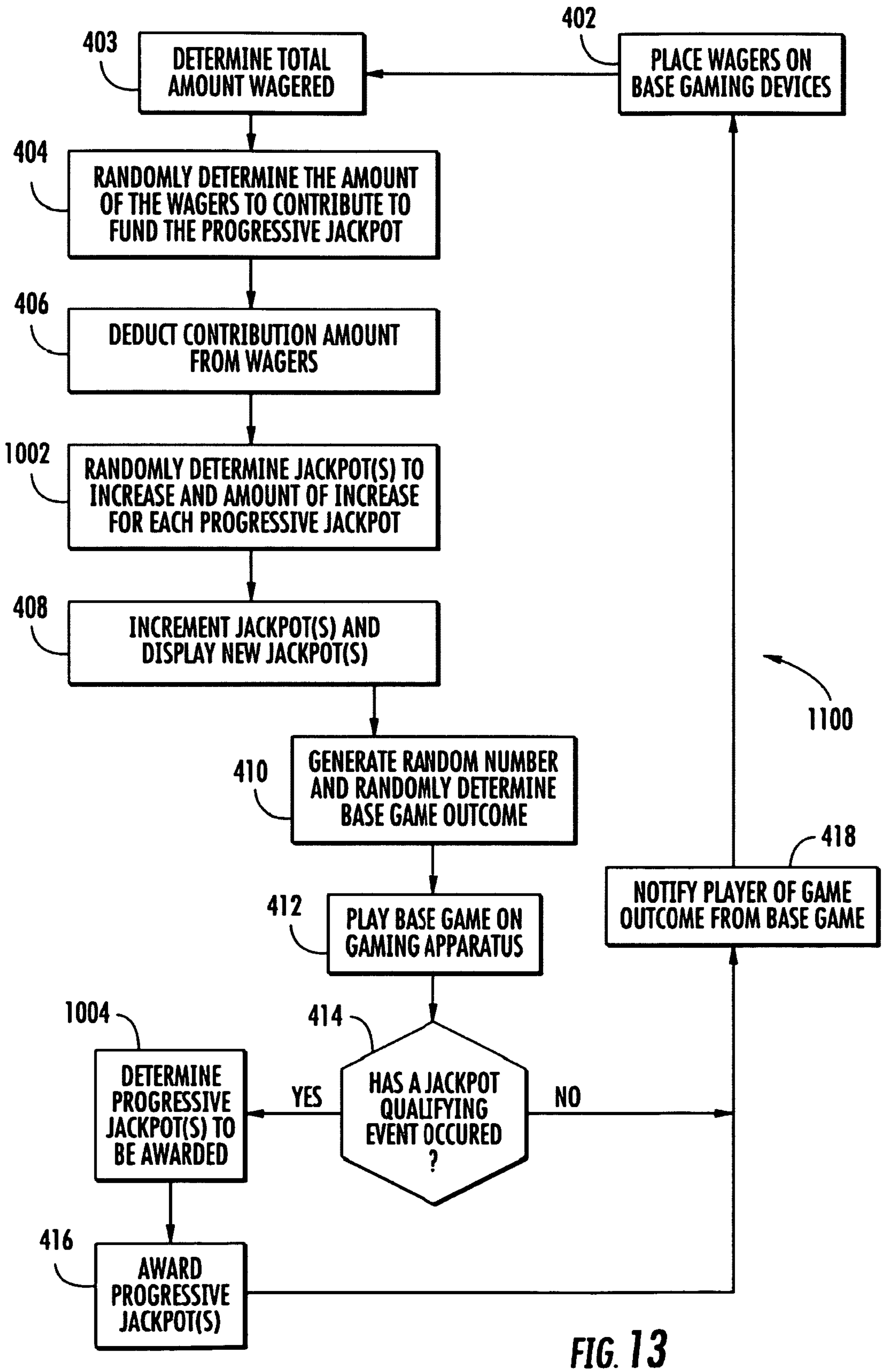
FIG. 13 is substantially a flowchart of another gaming method of the present invention using the gaming apparatus of FIG. 8.

Referring now to FIGS. 8, 3 and 13, another flowchart of an alternative embodiment of a method of game play 1100 using gaming apparatuses 800 and network 150 (FIG. 3) is shown. At step 402, a player may initiate game play method 1100 by placing a wager on one of gaming apparatuses 800 having a base or primary game 20. The wager may be in form of cash or credit from actual domestic or foreign currency, vouchers, coupons, tickets, electronic cards, and other sources or forms of wagers known in the art.

Once the player places a wager, server 160 determines the total amount wagered on all primary gaming devices 20 in network 150 at step 403. At step 404, server 160 randomly determines the contribution amount of the total amount wagered to be contributed or added to fund the progressive jackpots. The contribution amount can be a specific amount or can be a percentage of the total amount wagered. The contribution amount or percentage may vary within a range. For example, server 160 may require the contribution amount be between 1 and 20 percent of the total amount wagered.

The contribution amount is collected, apportioned or deducted from the total amount wagered at step 406.

At step 1002, server 160 divides or splits the randomly determined contribution amount among or between progressive jackpots 52-55. A portion of the contribution amount can be added to each of the progressive jackpots or all of the contribution amount may be added to one of the progressive jackpots. Server 160 randomly determines which of progressive jackpot 52-55 to increase and the amount of the increase or increase amount for each of the progressive jackpots 52-55.

Next, method 1100 proceeds to step 408 where each of the progressive jackpot increase amounts are added to progressive jackpots 52-55, respectively and the new award values 60-63 are displayed.

The base or primary game random number generator generates a first random number and randomly determines the primary or base game outcome at step 410. Next, the player may play a base or primary gaming device 20 at step 412.

At decision 414, controller 76 or server 160 checks for the occurrence of a jackpot qualifying or awarding event. If the controller or server does not detect a jackpot awarding event, method 1100 proceeds to step 418.

If the controller or server detects or determines a jackpot awarding event at decision step 414, method 1100 proceeds to step 1004, where server 160 determines which of progressive jackpot 52-55 are to be awarded. Server 160 may award 1, 2, 3 or all of progressive jackpots 52-55 as prize. At least one of progressive jackpots 52-55 are awarded to the player at step 416.

Next method 1100 proceeds to step 418 where the player is notified of the game outcome from the base or primary game. Method 1100 then returns to step 402 where the player may place another wager and play at least one of gaming apparatuses 800 again.

The steps shown in the flowchart do not necessarily imply that the steps have to take place in a particular order. The order of steps may be varied; some steps may be eliminated; and, some steps may be replaced with other steps. Such variations still fall within the scope of the invention.

CONCLUSION

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A gaming apparatus comprising:

(A) at least one gaming device having a wager acceptor, wherein the at least one gaming device is adapted to accept a wager via the wager acceptor and allow a player to play a game, wherein the wager acceptor is adapted to accept at least one of cash or credit from actual domestic or foreign currency, vouchers, coupons, tickets, and electronic cards;

(B) a computer network in communication with the at least one gaming device;

(C) a controller in communication with the at least one gaming device and the wager acceptor, the controller configured to be operable in the computer network for collecting, sending and receiving a signal and gaming information to and from the at least one gaming device via the computer network and being adapted to:

(a) maintain a progressive jackpot;

(b) randomly determine a contribution amount from the wager to fund the progressive jackpot;

(c) collect the contribution amount from the wager received by the wager acceptor;

(d) add the contribution amount to the progressive jackpot for incrementing the progressive jackpot; and (e) randomly determine a triggering event, selected from a time period and a value for the progressive jackpot to reach, at which the contribution amount being contributed for increasing the progressive jackpot will change, said triggering event occurring prior to a jackpot payout triggering event; and (D) a display that displays to the player the progressive jackpot and the triggering event at which the contribution amount being contributed for incrementing the progressive jackpot will change and that displays to the player an amount of time remaining until the contribution amount being contributed to the progressive jackpot will change.

2. The gaming apparatus of claim 1, wherein the contribution amount is a percentage of the wager calculated at the end of a game cycle.

3. The gaming apparatus of claim 1, wherein the contribution amount is within a pre-determined range of contribution amounts.

4. The gaming apparatus of claim 1, wherein the triggering event is the expiration of the time period.

5. The gaming apparatus of claim 1, wherein the triggering event is the progressive jackpot exceeding a randomly-determined value.

6. A method of gaming, using a processor device, on at least one gaming device having a wager acceptor adapted to accept a wager, the method comprising, not all necessarily in the order shown:

(A) allowing a player to place a wager using the wager acceptor and play a game at the at least one gaming device, the at least one gaming device including at least one progressive jackpot, wherein the wager acceptor is adapted to accept at least one of cash or credit from actual domestic or foreign currency, vouchers, coupons, tickets, and electronic cards;

(B) randomly determining in a controller in communication with the at least one gaming device a first amount of the wager to be apportioned to fund the progressive jackpot;

(C) collecting the first amount from the wager received by the wager acceptor;

(D) adding the first by the controller to the progressive jackpot for incrementing the progressive jackpot;

(E) determining in the controller a triggering event, selected from a time period and a value for the progressive jackpot to reach, when the first amount being contributed to increasing the progressive jackpot will change, said triggering event occurring prior to a jackpot payout triggering; and (F) displaying via the controller to the player on a display of the at least one gaming device the determined triggering event when the first amount being contributed for incrementing the progressive jackpot will change.

7. The method of claim 6, wherein the triggering event is the end of a time period.

8. The method of claim 6, wherein the triggering event occurs when the progressive jackpot exceeds a randomly-determined amount.

9. A gaming apparatus comprising:

(A) a plurality of gaming devices, each of the gaming devices having a wager acceptor and adapted to accept a wager via the wager acceptor and allow a player to play a game, wherein the wager acceptor is adapted to accept at least one of cash or credit from actual domestic or foreign currency, vouchers, coupons, tickets, and electronic cards;

(B) a computer network in communication with the at least one gaming device;

(C) a server in communication with at least one of the plurality of gaming devices and the computer network, the server configured to be operable in the computer network for collecting, sending and receiving gaming information from the at least one gaming device via the computer network and being adapted to:

(a) maintain a first progressive jackpot;

(b) determine a contribution amount from the wager to fund the progressive jackpot;

(c) collect the contribution amount from the wagers received by the wage acceptance means;

(d) add a first portion of the contribution amount to the first progressive jackpot for incrementing the first progressive jackpot; and (e) determine a triggering event selected from a time period and a value for the first progressive jackpot to reach, at which the contribution amount being contributed to the first progressive jackpot will change, said triggering event occurring prior to a jackpot payout triggering event; and (D) a display on the at least one gaming device, that displays to the player the triggering event at which the contribution amount being contributed to the first progressive jackpot will change and that displays to the player an amount of time remaining until the contribution amount being contributed to the progressive jackpot will change.

10. The gaming apparatus of claim 9, further comprising a second progressive jackpot maintained by the server wherein the contribution amount is further divided into a first portion and a second portion, the second portion added to the second progressive jackpot.

11. The gaming apparatus of claim 9, wherein the contribution amount is randomly determined.

12. The gaming apparatus of claim 10, wherein the first portion and the second portion are randomly determined.

13. The gaming apparatus of claim 9, wherein the contribution amount is changed upon the occurrence of the triggering event.

14. A method of gaming, using a processor device, on at least one gaming device having a wager acceptor adapted to accept a wager, the method comprising, not all necessarily in the order shown:

(A) allowing a player to place a wager using the wager acceptor and play a game at the at least one gaming device, the at least one gaming device including a first progressive jackpot and a second progressive jackpot;

(B) allocating a portion of the wager received from the wager acceptor to fund the first and second progressive jackpots, wherein the wager acceptor is adapted to accept at least one of cash or credit from actual domestic or foreign currency, vouchers, coupons, tickets, and electronic cards;

(C) determining in a controller how to split the portion of the wager into a first and second progressive jackpot funding amount;

(D) adding the first progressive jackpot funding amount to the first progressive jackpot;

(E) adding the second progressive jackpot funding amount to the second progressive jackpot;

(F) randomly determining in the controller a triggering event, selected from a time period and values for the first and the second progressive jackpots to reach, when the first and second progressive jackpot funding amounts being contributed for incrementing the first and the second progressive jackpots will change, said triggering event occurring prior to a jackpot payout triggering event; and (G) displaying to the player in a display of the at least one gaming device the determined triggering event when the funding amounts being contributed for incrementing the first and the second progressive jackpots will change and that displays to the player an amount of time remaining until the contribution amount being contributed for incrementing the progressive jackpot will change.

15. The method of claim 14, wherein the portion of the wager is randomly determined.

16. The method of claim 14, wherein the first and second progressive jackpot funding amounts are randomly determined.

17. The method of claim 14, wherein the portion of the wager collected is changed upon the occurrence of the triggering event.

18. The method of claim 14, wherein the portion of the wager is a percentage randomly selected from a range of percentages, and the method further comprises randomly determining in a controller how to split the portion of the wager into the first and second progressive jackpot funding amounts.

* * * * *